United States Patent [19]

Kresge et al.

[11] Patent Number: 5,174,888

[45] Date of Patent: * Dec. 29, 1992

[54] CATALYTIC CONVERSION

[75] Inventors: Charles T. Kresge, West Chester, Pa.; Michael E. Leonowicz, Medford Lakes; Wieslaw J. Roth, Sewell, both of N.J.; James C. Vartuli, West Chester, Pa.

[73] Assignee: Mobile Oil Corp., Fairfax, Va.

[*] Notice: The portion of the term of this patent subsequent to Jul. 28, 2009 has been disclaimed.

[21] Appl. No.: 783,473

[22] Filed: Oct. 28, 1991

Related U.S. Application Data

[63] Continuation-in-part of Ser. No. 470,008, Jan. 25, 1990, Pat. No. 5,102,643.

[51] Int. Cl.⁵ .................. C10G 11/05; C07C 1/24
[52] U.S. Cl. ........................ 208/46; 208/111; 208/120; 585/486; 585/640; 502/64
[58] Field of Search ............... 585/640; 208/46; 502/64

[56] References Cited

U.S. PATENT DOCUMENTS

| | | | |
|---|---|---|---|
| 3,414,602 | 12/1968 | Acara | 260/448 |
| 3,567,372 | 3/1971 | Duecker et al. | 23/111 |
| 3,884,835 | 5/1975 | Vaughan | 252/451 |
| 4,091,079 | 5/1978 | Vaughan | 423/328 |
| 4,176,090 | 11/1979 | Vaughan et al. | 252/455 Z |
| 4,216,188 | 8/1980 | Shabtai et al. | 423/118 |
| 4,248,739 | 3/1981 | Vaughan et al. | 252/455 R |
| 4,310,440 | 1/1982 | Wilson et al. | 252/435 |
| 4,367,163 | 1/1983 | Pinnavaia et al. | 252/455 R |
| 4,385,994 | 5/1983 | Wilson et al. | 210/689 |
| 4,440,871 | 4/1984 | Lok et al. | 502/214 |
| 4,481,177 | 11/1984 | Valyocsik | 423/329 |
| 4,578,258 | 3/1986 | Rieck | 423/325 |
| 4,582,693 | 4/1986 | Desmond et al. | 423/329 |
| 4,626,421 | 12/1986 | Zones | 423/326 |
| 4,632,815 | 12/1986 | Valyocsik | 423/328 |
| 4,640,829 | 2/1987 | Rubin | 423/328 |
| 4,650,655 | 3/1987 | Chu et al. | 423/328 |
| 4,661,332 | 4/1987 | Vaughan et al. | 423/326 |
| 4,673,559 | 6/1987 | Derouane et al. | 423/306 |
| 4,791,088 | 12/1988 | Chu et al. | 502/232 |
| 4,793,833 | 12/1988 | Lok et al. | 55/33 |
| 4,803,060 | 2/1989 | Occelli | 423/326 |
| 4,826,667 | 5/1989 | Zones et al. | 423/328 |
| 4,831,006 | 5/1989 | Aufdembrink | 502/242 |
| 4,859,648 | 8/1989 | Landis et al. | 502/242 |
| 4,880,611 | 11/1989 | von Ballmos et al. | 423/306 |
| 4,954,325 | 9/1990 | Rubin et al. | 423/328 |
| 5,091,073 | 2/1992 | Chang et al. | 585/640 |
| 5,102,643 | 4/1992 | Kresge et al. | 502/77 |
| 5,104,495 | 4/1992 | Chang et al. | 585/46 |
| 5,104,515 | 4/1992 | Chu et al. | 208/46 |

OTHER PUBLICATIONS

Eugster, H., "Hydrous Sodium Silicates from Lake Magadi, Kenya: Precursors of Bedded Chert", Science, vol. 157, pp. 1177-1180 (1967).

d'Yvoire, F., "Memoir: Study of Aluminum Phosphate and Trivalent Iron", pp. 1762-1776 (1961, rec'd).

Moore, P., et al., "An X-Ray Structural Study of Cacoxenite, a Mineral Phosphate", Nature, vol. 306, No. 5941, pp. 356-358 (1983).

Szostak, R. et al., "Ultralarge Pore Molecular Sieves: Characterization of the 14 Angstroms Pore Mineral, Cacoxenite", Zeolites: Facts, Figures and Future, Elseview Sc. Pub., BV (1989).

*Primary Examiner*—Anthony McFarlane
*Attorney, Agent, or Firm*—Alexander J. McKillop; Charles J. Speciale; Dennis P. Santini

[57] ABSTRACT

A process is provided for effecting catalytic conversion of an organic compound-containing feedstock to conversion product which comprises contacting said feedstock under catalytic conversion conditions with a catalyst comprising an active form of an inorganic, non-pillared crystalline phase exhibiting, after calcination, an X-ray diffraction pattern with at least one peak at a position greater than about 18 Angstrom Units d-spacing with a relative intensity of 100, and a benzene adsorption capacity of greater than about 15 grams benzene per 100 grams crystal at 50 torr and 25° C.

37 Claims, 14 Drawing Sheets

CATALYTIC CONVERSION

CROSS-REFERENCE TO RELATED APPLICATIONS

This is a continuation-in-part of U.S. application Ser. No. 07/470,008, filed Jan. 25, 1990, now U.S. Pat. No. 5,102,643.

BACKGROUND OF THE INVENTION

1. Field of the Invention

This invention relates to use of a novel composition of synthetic ultra-large pore crystalline material in catalytic conversion of organic compounds.

2. Description of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g. $AlO_4$, in which the tetrahedra are cross-linked by the sharing of oxygen atoms whereby the ratio of the total Group IIIB element, e.g. aluminum, and silicon atoms to oxygen atoms is 1:2. The electrovalence of the tetrahedra containing the Group IIIB element, e.g. aluminum, is balanced by the inclusion in the crystal of a cation, for example, an alkali metal or an alkaline earth metal cation. This can be expressed wherein the ratio of the Group IIIB element, e.g. aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 4,016,245), and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724, 4,073,865 and 4,104,294 describe crystalline silicate of varying alumina and metal content.

Aluminum phosphates are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous, is the "$H_1$" phase or hydrate of aluminum phosphate of F. d'Yvoire, *Memoir Presented to the Chemical Society*, No. 392, "Study of Aluminum Phosphate and Trivalent Iron", Jul. 6, 1961 (received), pp. 1762–1776. This material, when crystalline, is identified by the Joint Commission for Powder Diffraction Standards (JCPDS), card number 15-274. Once heated at about 110° C., however, the d'Yvoire material becomes amorphous or transforms to the aluminophosphate form of tridymite.

Compositions comprising crystals having a framework topology after heating at 110° C. or higher giving an X-ray diffraction pattern indicating pore windows formed by 18 tetrahedral members of about 12–13 Angstroms in diameter are taught in U.S. Pat. No. 4,880,611.

A naturally occurring, highly hydrated basic ferric oxyphosphate mineral, cacoxenite, is reported by Moore and Shen, *Nature*, Vol. 306, No. 5941, pp. 356–358 (1983) to have a framework structure containing very large channels with a calculated free pore diameter of 14.2 Angstroms. R. Szostak et al., *Zeolites: Facts, Figures, Future*, Elsevier Science Publishers B. V., 1989, present work showing cacoxenite as being very hydrophilic, i.e. adsorbing non-polar hydrocarbons only with great difficulty. Their work also shows that thermal treatment of cacoxenite causes an overall decline in X-ray peak intensity.

Silicoaluminophosphates of various structures are taught in U.S Pat. No. 4,440,871. Aluminosilicates containing phosphorous, i.e. silicoaluminophosphates of particular structures are taught in U.S. Pat. Nos. 3,355,246 (i.e. ZK-21) and 3,791,964 (i.e. ZK-22). Other teachings of silicoaluminophosphates and their synthesis include U.S. Pat. Nos. 4,673,559 (two-phase synthesis method); 4,623,527 (MCM-10); 4,639,358 (MCM-1); 4,647,442 (MCM-2); 4,664,897 (MCM-4); 4,638,357 (MCM-5); and 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417; and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, trititanates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090; and 4,367,163; and European Patent Application 205,711.

Applicants know of no prior art teaching the presently claimed use of synthetic ultra-large pore non-pillared crystalline materials.

SUMMARY OF THE INVENTION the present invention is directed to use of a novel synthetic composition of matter comprising an ultra-large pore crystalline phase as a catalyst component for conversation of organic compounds contacted therewith. The crystalline material for use in this invention has an inorganic, non-pillared phase indicating a maximum perpendicular cross-section port dimension of at least about 13, e.g. at least about 15, Angstroms. This novel crystalline composition exhibits a unique X-ray diffraction pattern and a benzene adsorption capacity of greater than about 15 grams benzene/100 grams anhydrous crystal at 50 torr and 25° C.

The entire contents of U.S. patent application Ser. No. 07/470,008 teaching the catalyst component for use herein are incorporated herein by reference.

DESCRIPTION OF SPECIFIC EMBODIMENTS

Figure 1:
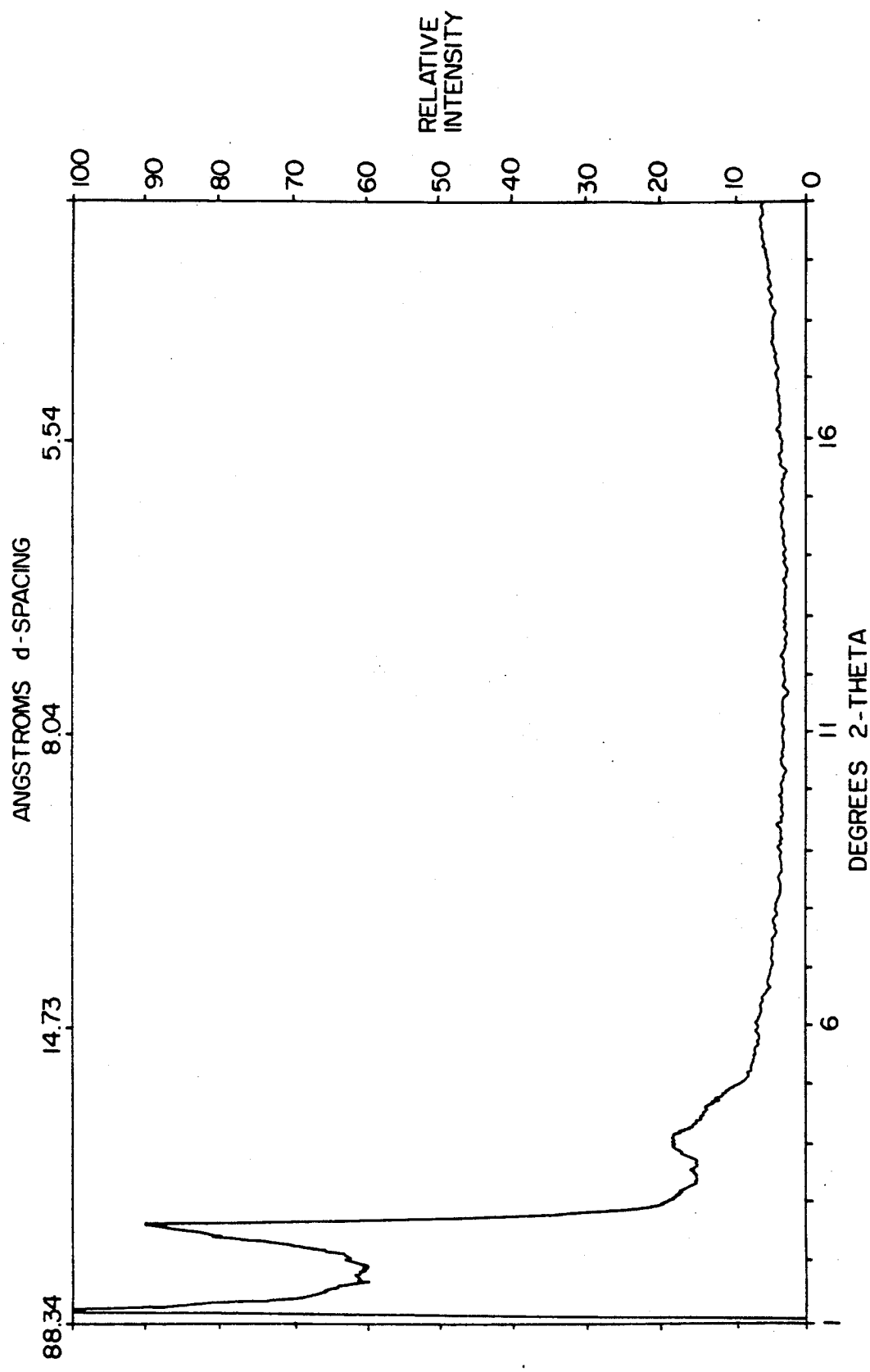
FIGS. 1-12 are X-ray diffraction patterns of products of Examples 1-6, 8-12 and 14, respectively, hereinafter presented.

As demonstrated hereinafter, the inorganic, non-pillared crystalline material for use in this invention has the following composition:

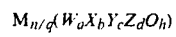
$$M_{n/q}(W_aX_bY_cZ_dO_h)$$

wherein W is a divalent element, such as a divalent first row transition metal, e.g. manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and $(a+b+c+d) = 1$.

A preferred embodiment of the above crystalline material is when $(a+b+c)$ is greater than d, and $h=2$. A further embodiment is when a and $d=0$, and $h=2$.

In the as-synthesized form, the material for use in this invention has a composition, on an anhydrous basis, expressed empirically as follows:

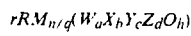
$$rRM_{n/q}(W_aX_bY_cZ_dO_h)$$

wherein R is the total organic material not included in M as an ion, and r is the coefficient for R, i.e. the number of moles or mole fraction of R.

The M and R components are associated with the material as a result of their presence during crystallization, and are easily removed or, in the case of M, replaced by post-crystallization methods hereinafter more particularly described.

To the extent desired, the original M, e.g. sodium or chloride, ions of the as-synthesized material for use in this invention can be replaced in accordance with techniques well known in the art, at least in part, by ion exchange with other ions. Preferred replacing ions include metal ions, hydrogen ions, hydrogen precursor, e.g. ammonium, ions and mixtures thereof. Particularly preferred ions are those which tailor the catalytic activity for certain hydrocarbon conversion reactions. These include hydrogen, rare earth metals and metals of Groups IA (e.g. K), IIA (e.g. Ca), VIIA (e.g. Mn), VIIIA (e.g. Ni),IB (e.g. Cu), IIB (e.g. Zn), IIIB (e.g. In), IVB (e.g. Sn), and VIIB (e.g. F) of the Periodic Table of the Elements (Sargent-Welch Scientific Co. Cat. No. 5-18806, 1979) and mixtures thereof.

The crystalline (i.e. having an X-ray diffraction pattern with at least one peak) material for use in this invention may be characterized by its heretofore unknown structure, including extremely large pore windows, and high sorption capacity.

In its calcined form, the non-layered, non-pillared crystalline material for use in the invention may be characterized by an X-ray diffraction pattern with at least one peak at a position greater than about 18 Angstrom Units d-spacing (4.909 degrees two-theta for Cu K-alpha radiation) with relative intensity of 100, and an equilibrium benzene adsorption capacity of greater than about 15 grams benzene/100 grams crystal at 50 torr and 25° C. (basis: crystal material having been treated to insure no pore blockage by incidental contaminants, if necessary).

The equilibrium benzene adsorption capacity characteristic of this material is measured on the basis of no pore blockage by incidental contaminants. For instance, the sorption test will be conducted on the crystalline material phase having pore blockage contaminants and water removed by ordinary methods. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the crystal of the invention.

More particularly, the calcined non-layered, non-pillared crystalline material for use in the invention may be characterized by an X-ray diffraction pattern with at least two peaks at positions greater than about 10 Angstrom Units d-spacing (8.842 degress two-theta for Cu K-alpha radiation), at least one of which is at a position greater than about 18 Angstrom Units d-spacing, and no peaks at positions less than about 10 Angstrom units d-spacing with relative intensity greater than about 20% of the strongest peak. Still more particularly, the X-ray diffraction pattern of the calcined material of this invention will have no peaks at positions less than about 10 Angstrom units d-spacing with relative intensity greater than about 10% of the strongest peak.

Still more particularly, the calcined inorganic, non-layered, non-pillared crystalline material for use in the invention is characterized as having a pore size of about 13 Angstroms or greater, e.g. at least about 15 Angstroms, as measured by physisorption measurements, hereinafter more particularly set forth, and an X-ray diffraction pattern with at least one peak at a position greater than about 18 Angstrom Units d-spacing with a relative intensity of 100. Pore size is considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks.

The diffraction data were recorded by step-scanning at 0.04 degrees of two-theta, where theta is the Bragg angle, and a counting time of 10 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75-100), s=strong (50-74), m=medium (25-49) and w=weak (0-24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the crystalline material for use in the invention, after oxidative calcination at 450°-700° C. for at least one hour and other treatment, if necessary, to remove any pore blocking contaminants, at 25° C. and 50 torr benzene until equilibrium is reached. The weight of benzene sorbed is then determined as more particularly described hereinafter.

When used as a sorbent or catalyst component, the composition for use in the invention should be subjected to treatment to remove part or all of any organic constituent. The present composition can also be used as a catalyst component in intimate combination with a hydrogenating component such as tungsten, vanadium, molybdenum, rhenium, nickel, cobalt, chromium, manganese, or a noble metal such as platinum or palladium where a hydrogenation-dehydroqenation function is to be peformed. Such component can be in the composition by way of co-crystallization, exchanged into the composition to the extent a Group IIIB element, e.g. aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The above crystalline material, especially in its metal, hydrogen and ammonium forms can be beneficially converted to another form by thermal treatment. This thermal treatment is generally performed by heating one of these forms at a temperature of at least 370° C. for at least 1 minute and generally not longer than 20 hours. While subatmospheric pressure can be employed for the thermal treatment, atmospheric pressure is desired for reasons of convenience, such as in air, nitrogen, ammonia, etc. The thermal treatment can be performed at a temperature up to about 925° C. The thermally treated product is particularly useful in the catalysis of certain hydrocarbon conversion reactions.

The crystalline material for use in this invention, when employed either as an adsorbent or as a catalyst component in an organic compound conversion process should be dehydrated, at least partially. This can be done by heating to a temperature in the range of 200° C. to 595° C. in an atmosphere such as air, nitrogen, etc.

and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

The present crystalline material can be prepared from a reaction mixture containing sources of, for example, alkali or alkaline earth metal (M), e.g. sodium or potassium, cation, one or a combination of oxides selected from the group consisting of divalent element W, e.g. cobalt, trivalent element X, e.g. aluminum, tetravalent element Y, e.g. silicon, and pentavalent element Z, e.g. phosphorus, an organic (R) directing agent, hereinafter more particularly described, and a solvent or solvent mixture, especially water, said reaction mixture having a composition, in terms of mole ratios of oxides, within the following ranges:

| Reactants | Useful | Preferred |
|---|---|---|
| $X_2O_3/YO_2$ | 0 to 0.05 | 0.001 to 0.05 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$YO_2$ | 1 to 1500 | 5 to 1000 |
| $OH^-/YO_2$ | 0.01 to 10 | 0.05 to 5 |
| $(M_{2/e}O + R_{2/f}O)/$ $(YO_2 + WO + Z_2O_5 + X_2O_3)$ | 0.01 to 20 | 0.05 to 5 |
| $M_{2/e}O/$ $(YO_2 + WO + Z_2O_5 + X_2O_3)$ | 0 to 10 | 0.005 to 5 | wherein e and f are the weighted average valences of M and R, respectively.

In the latter synthesis method, when no Z and/or W oxides are added to the reaction mixture, the pH is critical and must be maintained at from about 10 to about 14. When Z and/or W oxides are present in the reaction mixture, the pH is not narrowly critical and may vary between about 1 and 14 for crystallization of the present invention.

Crystallization of the present crystalline material can be carried out under either static or agitated, e.g. stirred, conditions in a suitable reactor vessel, such as for example, polypropylene jars or teflon lined or stainless steel autoclaves. The total useful range of temperatures for crystallization is from about 50° C. to about 250° C. for a time sufficient for crystallization to occur at the temperature used, e.g. from about 5 minutes to about 14 days. Thereafter, the crystals are separated from the liquid and recovered.

By adjusting conditions of the synthesis reaction, like temperature, pH and time of reaction, etc., within the above limits, embodiments of the present non-pillared crystalline material with a desired average pore size, may be prepared. In particular, lowering the pH, increasing the temperature or increasing reaction time may promote formation of product crystals with greater average pore size.

Non-limiting examples of various combinations of W, X, Y and Z contemplated for the present invention include:

| W | X | Y | Z |
|---|---|---|---|
| — | Al | Si | — |
| — | Al | — | P |
| — | Al | Si | P |
| Co | Al | — | P |
| Co | Al | Si | P |

-continued

| W | X | Y | Z |
|---|---|---|---|
| — | — | Si | — | including the combinations of W being Mg, or an element selected from the divalent first row transition metals, e.g. Mn, Co and Fe; X being B, Ga or Fe; and Y being Ge.

An organic directing agent for use in synthesizing the present material from the above reaction mixture is a quaternary ammonium or phosphonium ion of the formula:

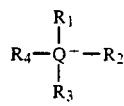

wherein Q is nitrogen or phosphorus and wherein at least one of $R_1$, $R_2$, $R_3$ and $R_4$ is aryl or alkyl of from 6 to about 36 carbon atoms, e.g. $-C_6H_{13}$, $-C_{10}H_{21}$, $-C_{16}H_{33}$ and $-C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. The compound from which the above quaternary ammonium or phosphonium ion is derived may be, for example, the hydroxide, halide, or silicate.

It is preferred in the present synthesis that an additional organic be present in the reaction mixture along with the above quaternary ammonium or phosphonium. That additional organic is the quaternary ammonium or phosphonium ion of the above directing agent formula wherein $R_1$, $R_2$, $R_3$ and $R_4$ are selected from the group consisting of hydrogen and alkyl of 1 to 5 carbon atoms and combinations thereof.

The particular effectiveness of the presently required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethylphosphonium, octadecyltrimethylammonium, octadecyltrimethylphosphonium, benzyltrimethylammonium, cetylpyridinium, decyltrimethylammonium and dimethyldidodecylammonium.

A preferred method for preparing the crystalline material for use herein is that of U.S. Pat. No. 5,057,296, incorporated herein by reference in its entirety.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared for use herein can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The present compositions are useful as catalyst components for catalyzing the conversion of organic compounds, e.g. oxygenates, such as alcohols, compounds containing a carbonyl group, ethers and mixtures thereof, and hydrocarbons, by acid-catalyzed reactions. The size of the pores is also such that the spatiospecific selectivity with respect to transition state species is minimized in reactions such as cracking (Chen et al., "Shape Selective Catalysis in Industrial Applications", 36 *Chemical Industries*, pgs. 41–61 (1989) to which reference is made for a discussion of the factors affecting shape selectivity). Diffusional limitations are also minimized as a result of the very large pores in the present materials. For these reasons, the present compositions are especially useful for catalyzing reactions which occur in the presence of acidic sites on the surface of the catalyst and which involve reactants, products or transitional state species which have large molecular sizes, too great for undergoing similar reactions with conventional large pore size solid catalysts, for example, large pore size zeolites such as zeolite X, Y, L, ZSM-4, ZSM-18, and ZSM-20.

Thus, the present catalytic compositions will catalyze reactions such as cracking, and hydrocracking, and other conversion reactions using hydrocarbon feeds of varying molecular sizes, but with particular applicability to feeds with large molecular sizes such as highly aromatic hydrocarbons with substituted or unsubstituted polycyclic aromatic components, bulky naphthenic compounds or highly substituted compounds with bulky steric configurations, e.g. molecular sizes of about 13 Angstroms or more, e.g. at least about 15 Angstroms. The present catalytic compositions are particularly useful for reactions in which the molecular weight of the feed is reduced to a lower value, i.e. to reactions involving cracking such as cracking or hydrocracking. Therefore, feedstock comprising hydrocarbon compounds is converted to product comprising hydrocarbon compounds of lower molecular weight than feedstock hydrocarbon compounds by contacting the feedstock at conversion conditions with catalyst comprising the present crystalline material. Cracking may be conducted at a temperature of from about 200° C. to about 800° C., a pressure of from about atmospheric to about 100 psig and contact time of from about 0.1 second to about 60 minutes. Hydrocracking may be conducted at a temperature of from about 150° C. to about 550° C., a pressure of from about 100 psig to about 3000 psig, and a weight hourly space velocity of from about 0.1 hr$^{-1}$ to about 100 hr$^{-1}$, with a hydrogen/hydrocarbon molar ratio of from about 0.1 to about 100.

These catalytic compositions may also be used for converting feedstock comprising organic compounds selected from the group consisting of alcohols, compounds containing a carbonyl group, ethers and mixtures thereof to conversion product comprising hydrocarbon compounds. This conversion comprises contacting the feedstock at conversion conditions with catalyst comprising the present crystalline material. Conversion conditions for this include a temperature of from about 275° C. to about 600° C., a pressure of from about 0.5 atmosphere to about 50 atmospheres and a liquid hourly space velocity of from about 0.5 hr to about 100 hr$^{-1}$.

The catalytic compositions of matter according to the present invention may also be used for selective conversion of inorganic compounds such as oxides of nitrogen in mixtures of gases which contain nitrogen oxides (NO$_x$), for example, industrial exhaust gases and the gases formed during the oxidative regeneration of catalysts used in the processing of hydrocarbons, especially in catalytic cracking operations. The porous crystalline material may be used in a matrixed or unmatrixed form for this purpose and may suitably be formed into extrudates, pellets or other shapes to permit the passage of gases over the catalyst with the minimum pressure drop. The crystalline material is preferably at least partly in the hydrogen form, but it may advantageously contain a minor amount of a noble metal as a catalytic component, especially a metal of Periods 5 and 6 of Group VIIIA of the Periodic Table, especially platinum, palladium, ruthenium, rhodium or iridium. Amounts of noble metal up to about 1 weight percent are typical with lower amounts, e.g. up to about 0.1 or 0.5 weight percent being preferred.

The NO$_x$ reduction is suitably conducted by passing the gas containing the oxides of nitrogen over the catalyst at an elevated temperature, typically at least 200° C., and usually within the range of 200° to 600° C. The gas mixture may be mixed with ammonia to promote reduction of the oxides of nitrogen and pre-mixing may be conducted at a temperature of up to about 200° C. The amount of ammonia which is mixed with the gas mixture is typically within the range of 0.75 to 1.25 the stoichiometric amount, which itself varies according to the ratio of the different oxides of nitrogen in the gas mixture, as shown by the equations:

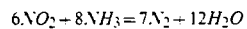

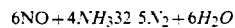

The crystalline catalytic compositions of matter may also be used for the reduction of oxides of nitrogen in gaseous mixtures in the presence of other reducing agents such as carbon or carbon monoxide. Reduction of the oxides of nitrogen in this way is of particular utility in the regeneration of fluid catalytic cracking (FCC) catalysts, since regeneration under appropriate conditions will produce the required concentrations of carbon monoxide which may then be used to reduce the proportion of NO$_x$ in the regeneration gases in the presence of the catalyst.

Because the present catalytic compositions have been found to be stable, their use as cracking catalysts, e.g. in fluid catalytic cracking processes, with resid feeds will represent an especially favorable mode of utilization. Still further, they may be used in combination with one or more other catalyst components such as, for example, cracking catalysts comprising silica-alumina and/or zeolite Y, e.g. USY.

The present catalytic compositions are especially useful for reactions using high molecular weight, high boiling or non-distillable feeds, especially residual feeds, i.e. feeds which are essentially non-distillable or feeds which have an initial boiling point (5% point) above about 1050° F. Residual feeds which may be used with the present catalytic compositions include feeds with API gravities below about 20, usually below 15 and typically from 5 to 10 with Conradsen Carbon Contents (CCR) of at least 1% by weight and more usually at least 5% or more, e.g. 5–10%. In some resid fractions the CCR may be as high as about 20 weight percent or even higher. The aromatic contents of these feeds will be correspondingly high, as may the contents of heteroatoms such as sulfur and nitrogen, as well as metals. Aromatics content of these feeds will usually be at least 50 weight percent and typically much higher, usually at least 70 or 80 weight percent, with the balance being principally naphthenes and heterocyclics. Typical petroleum refinery feeds of this type include atmospheric and vacuum tower resids, asphalts, aromatic extracts from solvent extraction processes, e.g. phenol or furfural extraction, deasphalted oils, slop oils and residual fractions from various processes such as lube production, coking and the like. High boiling fractions with which the present catalytic compositions may be used include gas oils, such as atmospheric gas oils; vacuum gas oils; cycle oils, especially heavy cycle oil; deasphalted oils; solvent extracts, such as bright stock; heavy gas oils, such as coker heavy gas oils; and the like. The present catalytic materials may also be utilized with feeds of non-petroleum origin, for example, synthetic oils produced by coal liquefaction, Fischer-Tropsch waxes and heavy fractions and other similar materials.

When the feedstock to the present process comprises oxygenates, it will comprise lower aliphatic alcohols, carbonyls, ethers or mixtures thereof. Feedstock alcohols will be aliphatic alcohols of from 1 to about 6 carbon atoms, preferably from 1 to 3 carbon atoms, e.g. methanol and ethanol. Feedstock carbonyls will be lower aliphatic carbonyls, such as, for example, acetone. Feedstock ethers will be lower aliphatic ethers of up to about 6 carbon atoms, e.g. from 2 to about 6 carbon atoms, such as dimethylether, n-propyl ether, p-dioxane, trioxane and hexose.

The product of this process when alcohols, carbonyls or ethers are converted will be predominately hydrocarbons including olefins of from 2 to 5 or more carbon atoms.

Aromatic hydrocarbons, such as durene, are also produced. $C_3$ and $C_4$ olefins are desired chemical products, and $C_5^+$ products are valuable as gasoline components.

The crystalline compositions for use in this invention can also be used as adsorbents and separation vehicles in pharmaceutical and fine chemical applications. For example, these ultra-large pore compositions may be used in the purification of drugs like insulin or be used as solid vehicles for the controlled delivery of drugs. Another application for use of these ultra-large pore materials involves waste disposal where the extraordinary pore volumes are exploited. Therefore, at least one component can be separated from a mixture of components having differential sorption characteristics with respect to the present ultra-large pore composition by contacting the mixture with the composition to selectively sorb the one component. Examples of this include contacting a mixture comprising water and at least one hydrocarbon component, whereby the at least one hydrocarbon component is selectively sorbed. Another example includes selective sorption of at least one hydrocarbon component from a mixture comprising same and at least one additional hydrocarbon component.

As in the case of many catalysts, it may be desired to incorporate the new crystal composition with another material resistant to the temperatures and other conditions employed in organic conversion processes. Such materials include active and inactive materials and synthetic or naturally occurring zeolites as well as inorganic materials such as clays, silica and/or metal oxides such as alumina, titania and/or zirconia. The latter may be either naturally occurring or in the form of gelatinous precipitates or gels including mixtures of silica and metal oxides. Use of a material in conjunction with the new crystal, i.e. combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated with naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

It may be desirable to provide at least a part of the foregoing matrix materials in colloidal form so as to facilitate extrusion of the bound catalyst component(s).

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented. In the examples, whenever sorption data are set forth for comparison of sorptive capacities for water, cyclohexane, benzene and/or n-hexane, they are Equilibrium Adsorption values determined as follows:

A weighed sample of the anhydrous adsorbent, after oxidative calcination at 450°–700° C. for at least 1 hour and other treatment, if necessary, to remove any pore blocking contaminants, is contacted with the desired pure adsorbate vapor in an adsorption chamber, evacuated to less than 1 mm and contacted with 12 Torr of water vapor, 40 Torr of n-hexane or cyclohexane vapor, and 50 Torr of benzene vapor, at 25° C. The pressure is kept constant (within about ±0.5 mm) by addition of adsorbate vapor controlled by a manostat during the adsorption period. As adsorbate is adsorbed by the new crystal, the decrease in pressure causes the manostat to open a valve which admits more adsorbate vapor to the chamber to restore the above control pressures. Sorption is complete when the pressure change was not sufficient to activate the manostat. The increase in weight is calculated as the adsorption capacity of the sample in terms of grams/100 grams anhydrous adsorbent. The present composition exhibits an equilibrium benzene adsorption capacity at 50 Torr and 25° C. of greater than about 15 grams/100 grams anhydrous crystal, particularly greater than about 17.5 g/100 g, and more particularly greater than about 20 g/100 g.

In the examples, percentages are by weight unless otherwise indicated.

EXAMPLE 1

One hundred grams of 29% (by weight) cetyltrimethylammonium (CTMA) hydroxide was combined with 100 grams of tetramethylammonium (TMA) silicate (10% silica) with stirring. A 25 gram quantity of HiSil, a precipitated hydrated silica containing about 6 wt.% free water and about 4.5 wt.% bound water of hydration and having an ultimate particle size of about 0.02 micron, was added. The resulting mixture was placed in a polypropylene bottle, which was kept in a steam box at 95° C. overnight. The mixture had a composition in terms of moles per mole $Al_2O_3$:

2.7 moles $Na_2O$
392 moles $SiO_2$
35.7 moles $(CTMA)_2O$
61.7 moles $(TMA)_2O$
6231 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 475 $m^2/g$ and the following equilibrium adsorption capacities in grams/100 grams anhydrous sorbent:

| | |
|---|---|
| $H_2O$ | 8.3 |
| Cyclohexane | 22.9 |
| n-Hexane | 18.2 |
| Benzene | 21.5 |

The X-ray diffraction pattern of the calcined product of this example is shown in FIG. 1. In this and the following Figures, it is noted that 10 Angstrom Units d-spacing corresponds to 8.842 degrees 2-theta (Cu K-alpha radiation) and 18 Angstrom Units corresponds to 4.909 degrees.

The product of this example may be characterized as including a very strong relative intensity line at 37.8±2.0 Angstroms d-spacing, and weak lines at 21.6±0.5 and 19.2±0.5 Angstroms.

EXAMPLE 2

One hundred grams of 29% cetyltrimethylammonium (CTMA) hydroxide was combined with 100 grams of tetramethylammonium (TMA) hydroxide solution (40%) with stirring. Twenty-five grams of HiSil, a precipitated hydrated silica containing about 6 wt.% free water and about 4.5 wt.% bound water of hydration and having an ultimate particle size of about 0.02 micron, was added. The resulting mixture was placed in a static autoclave at 150° C. overnight. The mixture had a composition in terms of moles per mole $Al_2O_3$:

2.7 moles $Na_2O$
291 moles $SiO_2$
35.7 moles $(CTMA)_2O$
102 moles $(TMA)_2O$
6122 moles $H_2O$ The resulting solid product was recovered by filtration and dried in air at ambient temperature. The product was then calcined at 540° C. for 1 hour in nitrogen, followed by 6 hours in air. The calcined product proved to have a surface area of 993 $m^2/g$ and the following equilibrium adsorption capacities in grams/100 grams anhydrous sorbent:

| | |
|---|---|
| $H_2O$ | 7.1 |
| Cyclohexane | 47.2 |
| n-Hexane | 36.2 |
| Benzene | 49.5 |

Figure 2:
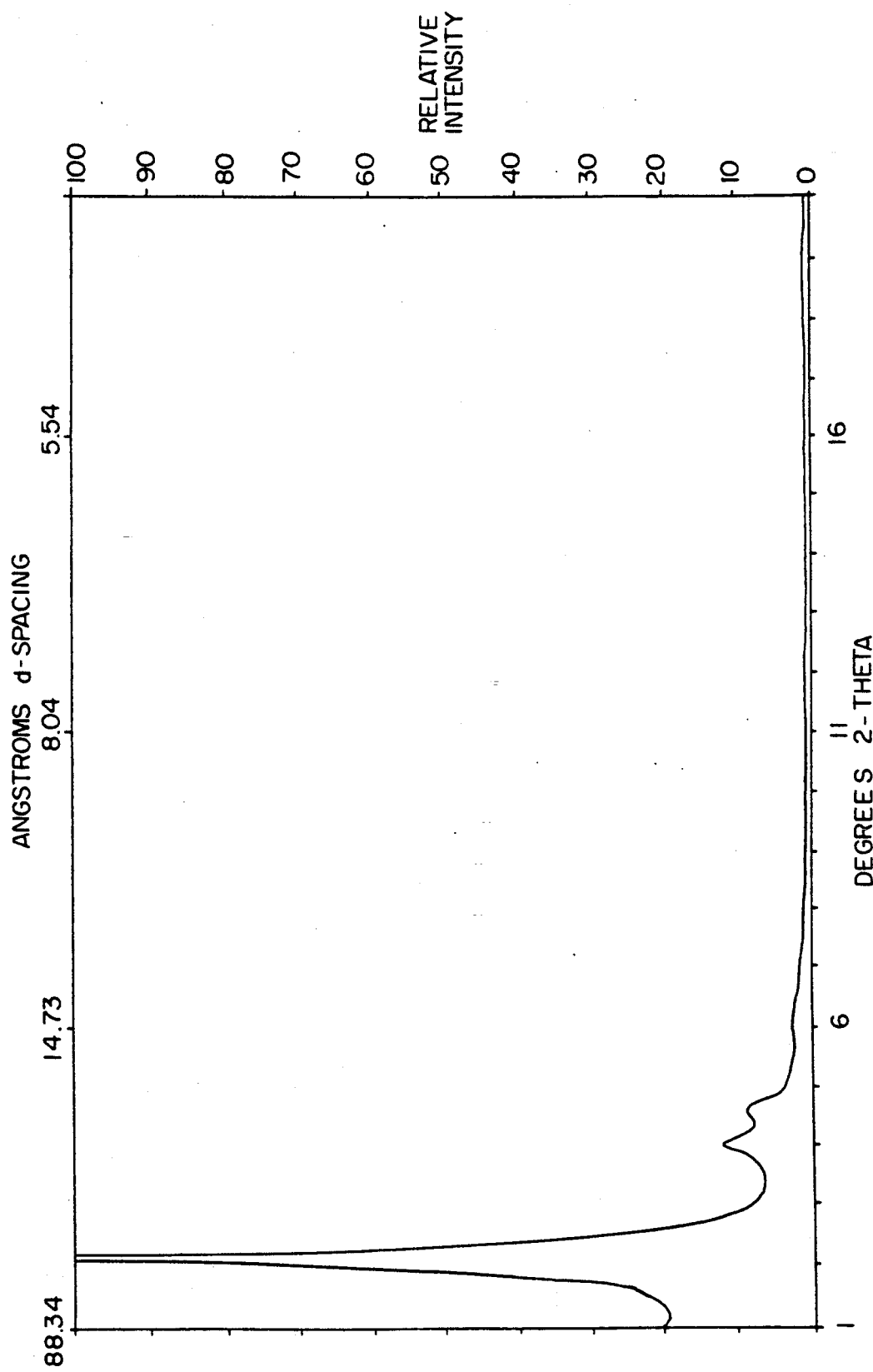

The X-ray diffraction pattern of the calcined product of this example is shown in FIG. 2. It may be characterized as including a very strong relative intensity line at 39.3±2.0 Angstroms d-spacing, and weak lines at 22.2±0.5 and 19.4±0.5 Angstroms.

A portion of the above product was then contacted with 100% steam at 1450° F. for two hours. The surface area of the steamed material was measured to be 440 $m^2/g$, indicating that about 45% was retained following severe steaming. Another portion of the calcined product of this example was contacted with 100% steam at 1250° F. for two hours. The surface area of this material was measured to be 718 $m^2/g$, indicating that 72% was retained after steaming at these conditions.

EXAMPLE 3

Water, cetyltrimethylammonium hydroxide (29%), aluminum sulfate, HiSil and tetrapropylammonium (TPA) bromide (35%) were combined to produce a mixture having a composition in terms of moles per mole $Al_2O_3$:

0.77 moles $Na_2O$
65 moles $SiO_2$
8.7 moles $(CTMA)_2O$
1.22 moles $(TPA)_2O$
1344 moles $H_2O$ The resulting mixture was placed in a polypropylene bottle, which was kept in a steam box at 95° C. for 192 hours. The sample was then cooled to room temperature and combined with CTMA hydroxide (29% by weight) and TMA hydroxide (25% by weight) in the weight ratio of 3 parts mixture, 1 part CTMA hydroxide and 2 parts TMA hydroxide. The combined mixture was then placed in a polypropylene bottle and kept in a steam box at 95° C. overnight. The combined mixture had a composition in terms of moles per mole $Al_2O_3$:

0.77 moles $Na_2O$
65 moles $SiO_2$
15 moles $(CTMA)_2O$
1.22 moles $(TPA)_2O$
35.6 moles $(TMA)_2O$
2935 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 1085 $m^2/g$ and the following equilibrium adsorption capacities in grams/100 grams anhydrous sorbent:

| | |
|---|---|
| $H_2O$ | 11.5 |
| Cyclohexane | >50 |
| n-Hexane | 39.8 |

-continued

| | |
|---|---|
| Benzene | 62 |

Figure 3:
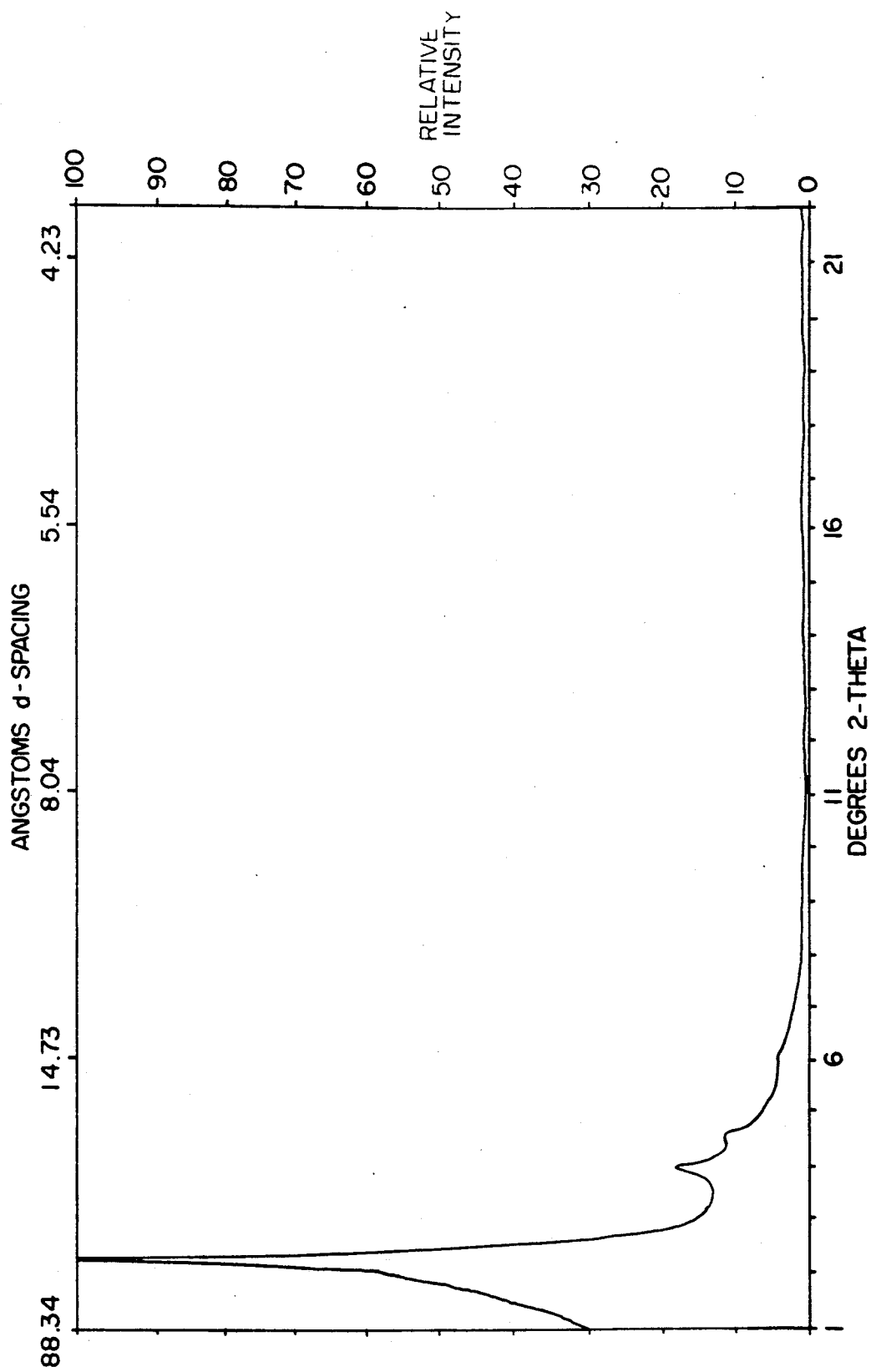

The X-ray diffraction pattern of the calcined product of this example is shown in FIG. 3. The product of this example may be characterized as including a very strong relative intensity line at 38.2±2.0 Angstroms d-spacing, and weak lines at 22.2±0.5 and 19.4±0.5 Angstroms.

EXAMPLE 4

Two hundred grams of 29% cetyltrimethylammonium (CTMA) hydroxide was combined with 2 grams of Catapal alumina (alpha-alumina monohydrate) and 100 grams of tetramethylammonium (TMA) silicate (10% silica) with stirring. Twenty-five grams of HiSil, a precipitated hydrated silica containing about 6 wt.% free water and about 4.5 wt.% bound water of hydration and having an ultimate particle size of about 0.02 micron, was added. The resulting mixture was placed in a static autoclave at 150° C. for 48 hours. The mixture had a composition in terms of moles per mole $Al_2O_3$:
0.23 moles $Na_2O$
33.2 moles $SiO_2$
6.1 moles $(CTMA)_2O$
5.2 moles $(TMA)_2O$
780 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 1043 $m^2/g$ and the following equilibrium adsorption capacities in grams/100 grams anhydrous sorbent:

| | |
|---|---|
| $H_2O$ | 6.3 |
| Cyclohexane | >50 |
| n-Hexane | 49.1 |
| Benzene | 66.7 |

Figure 4:
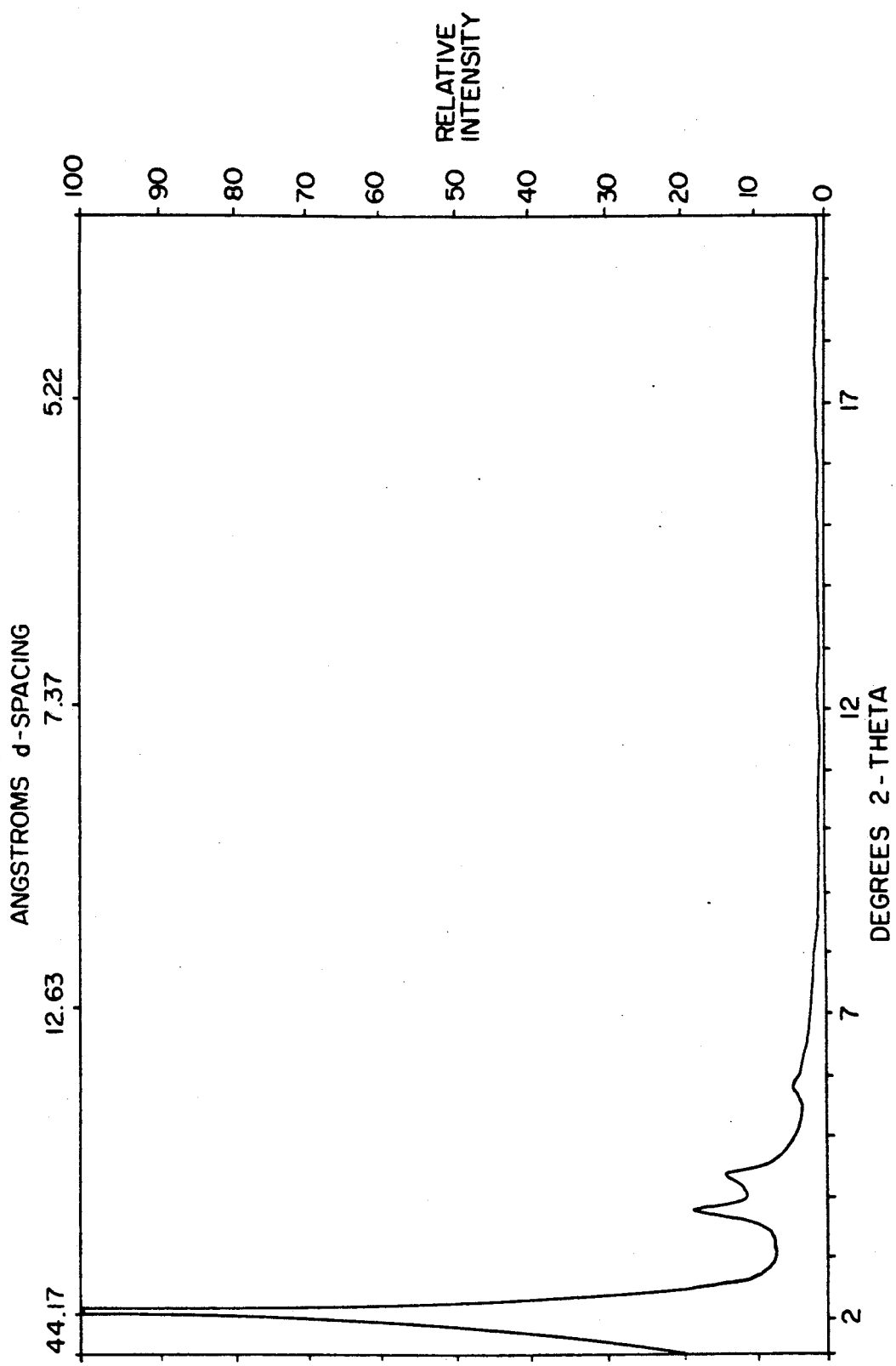

The X-ray diffraction pattern of the calcined product of this example is shown in FIG. 4. It may be characterized as including a very strong relative intensity line at 40.8±2.0 Angstroms d-spacing, and weak lines at 23.1±0.5 and 20.1±0.5 Angstroms.

EXAMPLE 5

Two hundred sixty grams of water was combined with 77 grams of phosphoric acid (85%), 46 grams of Catapal alumina, and 24 grams of pyrrolidine (Pyr) with stirring. This first mixture was placed in a stirred autoclave and heated to 150° C. for six days. The material was filtered, washed and air-dried. Fifty grams of this product was slurried with 200 grams of water and 200 grams of 29% cetyltrimethylammonium hydroxide. Four hundred grams of tetraethylammonium silicate (10% silica) was then added to form a second mixture which was placed in a polypropylene bottle and kept in a steam box at 95° C. overnight. The first and second mixtures had compositions in terms of moles per mole $Al_2O_3$:

| First | Second |
|---|---|
| — | 4.3 moles $SiO_2$ |
| 0.82 | 0.82 moles $P_2O_5$ |
| — | 0.625 moles $(CTMA)_2O$ |
| — | 2.16 moles $(TMA)_2O$ |
| 0.41 | 0.41 moles $(Pyr)_2O$ |
| 37.8 | 273 moles $H_2O$ |

The resulting solid product was recovered by filtration and dried in air at ambient temperature. The product was then calcined at 540° C. for 1 hour in nitrogen, followed by 6 hours in air.

The calcined product proved to have a surface area of 707 $m^2/g$ and the following equilibrium adsorption capacities in grams/100 grams anhydrous sorbent:

| | |
|---|---|
| $H_2O$ | 33.2 |
| Cyclohexane | 19.7 |
| n-Hexane | 20.1 |
| Benzene | 23.3 |

Figure 5:
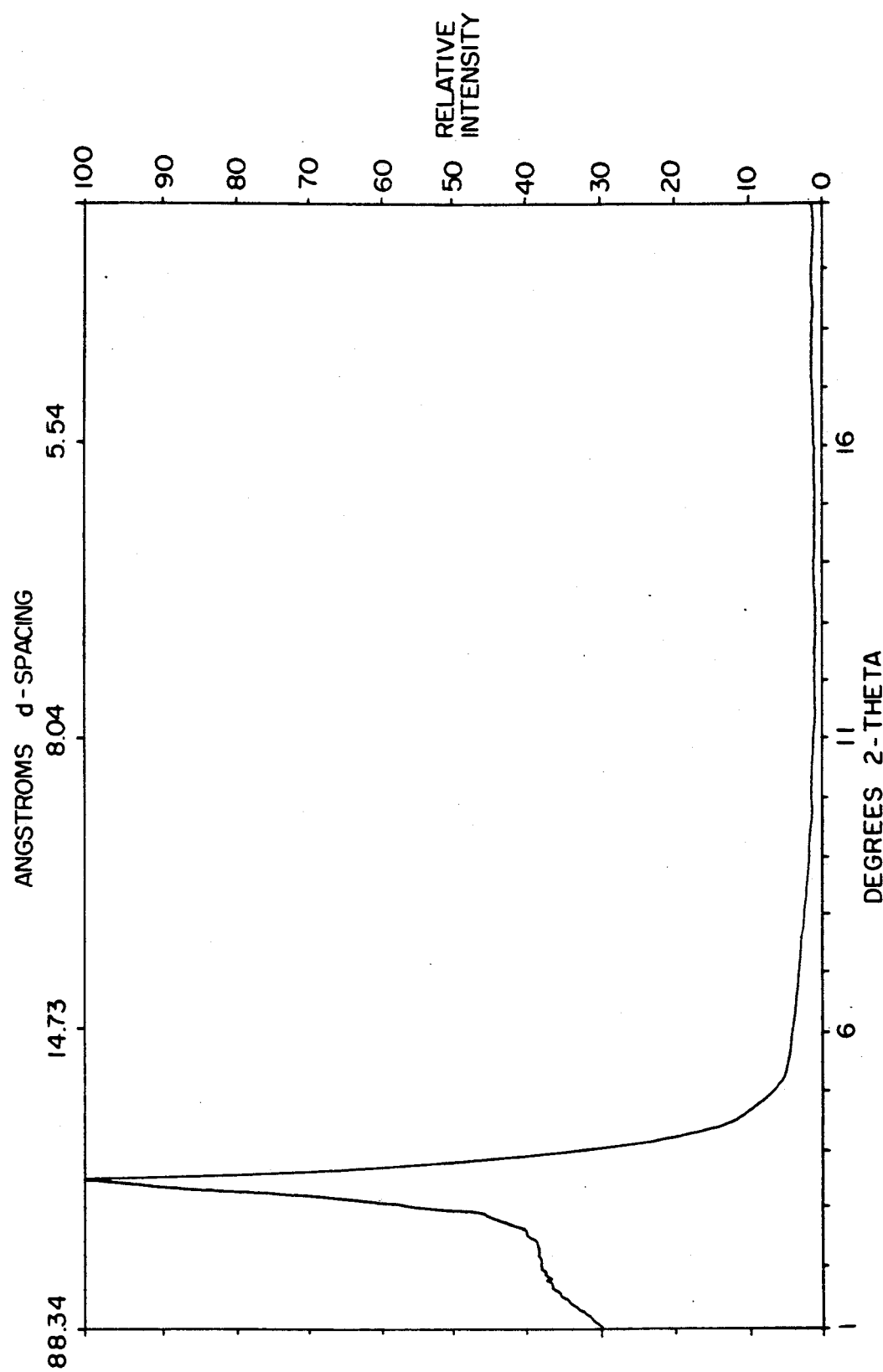

The X-ray diffraction pattern of the calcined product of this example is shown in FIG. 5. It may be characterized as including a very strong relative intensity line at 25.4±1.0 Angstroms d-spacing.

EXAMPLE 6

A first solution of 1.35 grams of $NaAlO_2$ (43.5% $Al_2O_3$, 30% $Na_2O$) dissolved in 45.2 grams of water was mixed with 17.3 grams of NaOH, 125.3 grams of colloidal silica (40%, Ludox HS-40) and 42.6 grams of 40% tetraethylammonium (TEA) hydroxide. After stirring overnight, the mixture was heated for 7 days in a steam box (95° C.). Following filtration, 151 grams of the solution was mixed with 31 grams of 29% cetyltrimethylammonium hydroxide solution and stored in the steam box at 95° C. for 13 days. The mixture had the following relative molar composition:
0.25 moles $Al_2O_3$
10 moles $Na_2O$
36 moles $SiO_2$
0.95 moles $(CTMA)_2O$
2.5 moles $(TEA)_2O$
445 moles $H_2O$ The resulting solid product was recovered by filtration and washed with water and ethanol. The product was then calcined at 540° C. for 1 hour in nitrogen, followed by 6 hours in air.

The calcined product proved to have a benzene equilibrium adsorption capacity of 58.6 grams/100 grams anhydrous sorbent.

Figure 6:
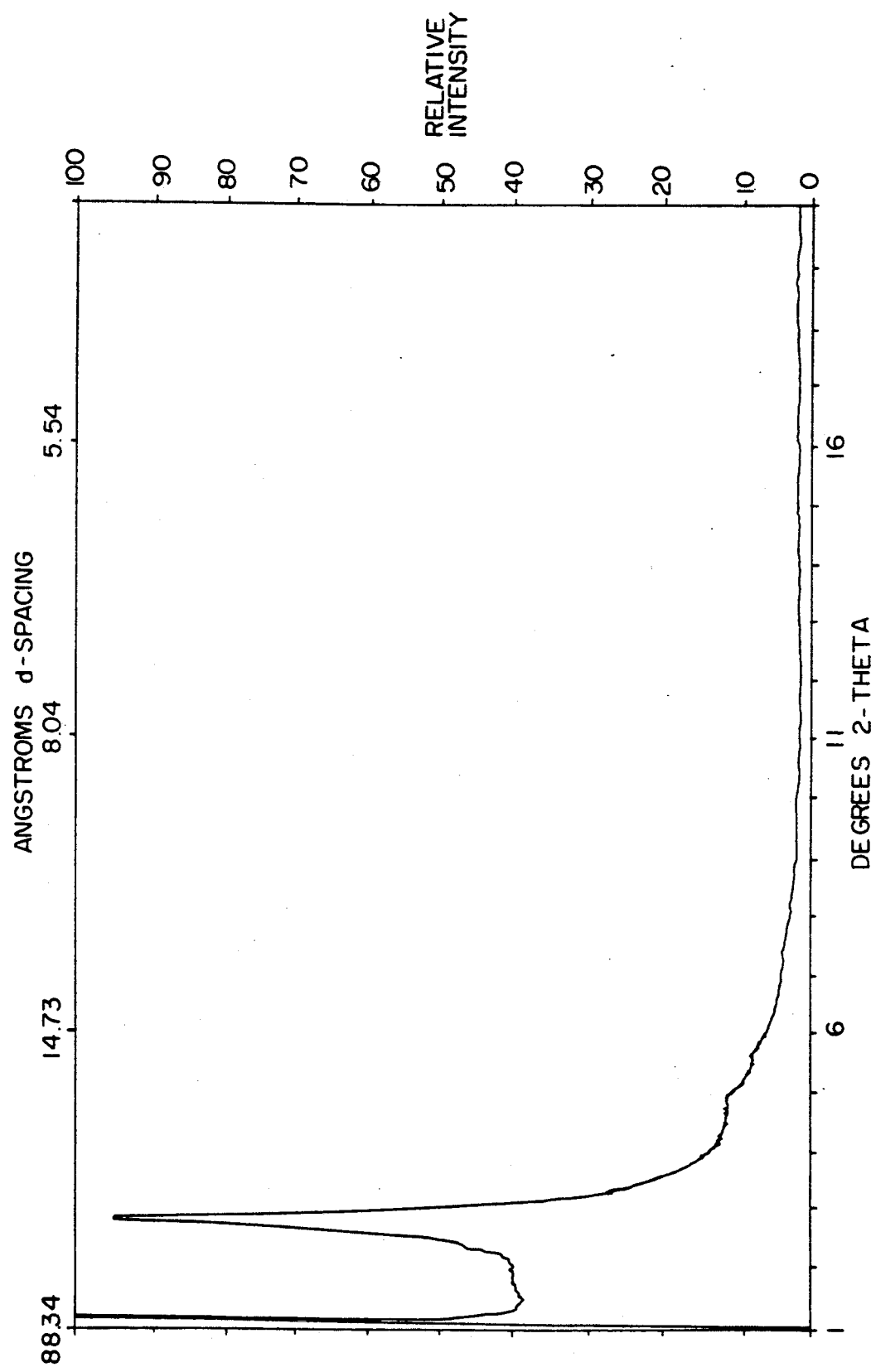

The X-ray diffraction pattern of the calcined product of this example is shown in FIG. 6. The product of this example may be characterized as including a very strong relative intensity line at 31.4±1.0 Angstroms d-spacing.

EXAMPLE 7

The mixture of 100 grams of 50% octadecyltrimethylammonium (OTMA) hydroxide, 50 grams of water and 50 grams of colloidal silica (40%, Ludox HS-40) was heated in a 600 cc autoclave at 150° C. for 24 hours with stirring at 200 rpm. The mixture had the following relative molar composition in terms of moles per mole silica:
0.22 moles $(OTMA)_2O$
21.7 moles $H_2O$ The solid product was isolated by filtration, washed with water, dried for 2 hours at 100° C. and calcined at 540° C. for 6 hours.

The calcined product proved to have a benzene equilibrium adsorption capacity of 52.1 g/100 g of anhydrous sorbent. Its X-ray diffraction pattern was characteristic of the present ultra-large pore material and included a very strong relative intensity line at 41.7±2.0 Angstroms d-spacing and a very weak line at 21.3±0.5 Angstroms.

EXAMPLE 8

A mixture of 300 grams of 29% cetyltrimethylammonium (CTMA) hydroxide and 41 grams of colloidal silica (40%, Ludox HS-40) was heated in a 600 cc autoclave at 150° C. for 48 hours with stirring at 200 rpm. The mixture had a composition in terms of moles per mole $SiO_2$:

0.5 moles $(CTMA)_2O$
46.5 moles $H_2O$

The resulting solid product was recovered by filtration, washed with water, then calcined at 540° C. for 1 hour in nitrogen, followed by 10 hours in air.

The calcined product proved to have a surface area of 896 m²/g and the following equilibrium adsorption capacities in grams/100 grams anhydrous sorbent:

| | |
|---|---|
| $H_2O$ | 8.4 |
| Cyclohexane | 49.8 |
| n-Hexane | 42.3 |
| Benzene | 55.7 |

Figure 7:
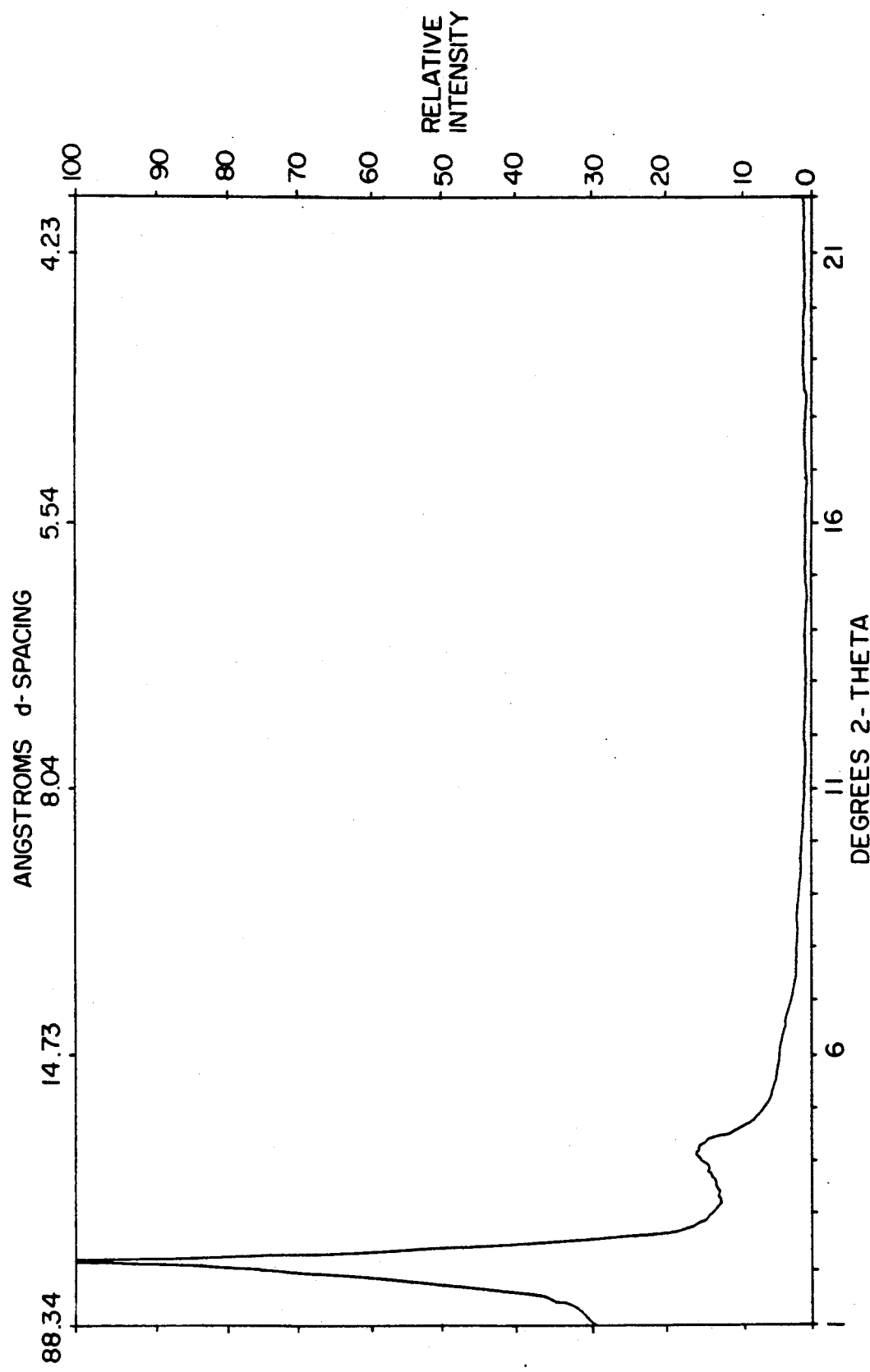

The X-ray diffraction pattern of the calcined product of this example is shown in FIG. 7. It may be characterized as including a very strong relative intensity line at 40.0±2.0 Angstroms d-spacing and a weak line at 21.2±0.5 Angstroms.

EXAMPLE 9

A mixture of 150 grams of 29% cetyltrimethylammonium (CTMA) hydroxide and 21 grams of colloidal silica (40%, Ludox HS-40) with an initial pH of 12.64 was heated in a 300 cc autoclave at 150° C. for 48 hours with stirring at 200 rpm. The mixture had a composition in terms of moles per mole $SiO_2$:

0.5 moles $(CTMA)_2O$
46.5 moles $H_2O$

The resulting solid product was recovered by filtration, washed with water, then calcined at 540° C. for 6 hours in air.

The calcined product proved to have a surface area of 992 m²/g and the following equilibrium adsorption capacities in rams/100 grams anhydrous sorbent:

| | |
|---|---|
| $H_2O$ | 4.6 |
| Cyclohexane | >50 |
| n-Hexane | >50 |
| Benzene | 62.7 |

Figure 8:
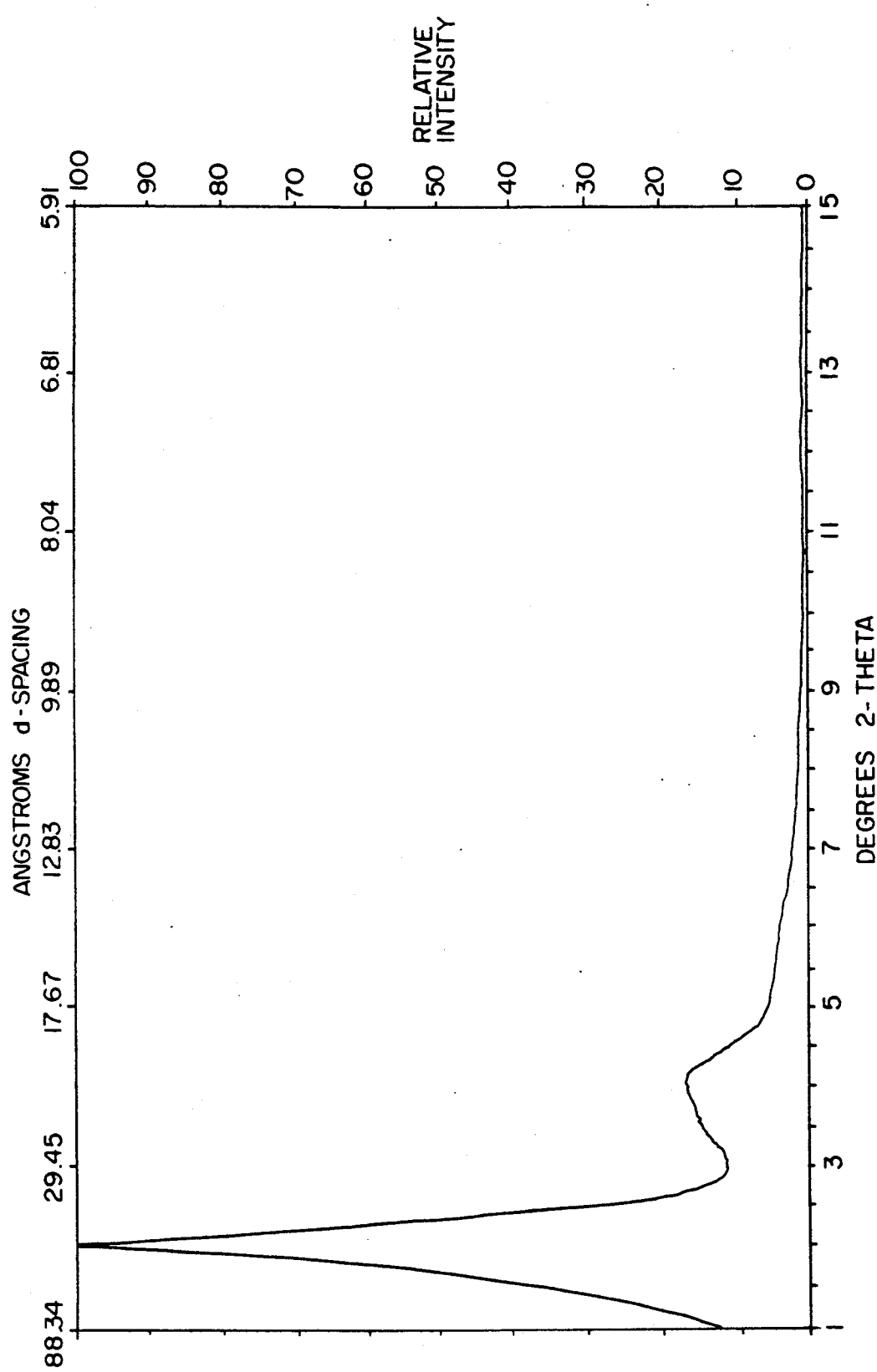

The X-ray diffraction pattern of the calcined product of this example is shown in FIG. 8. This product may be characterized as including a very strong relative intensity line at 43.6±2.0 Angstroms d-spacing and weak lines at 25.1±1.0 and 21.7±0.5 Angstroms.

EXAMPLE 10

A solution of 2.7 grams of $NaAlO_2$ (43.5% $Al_2O_3$, 30% $Na_2O$) in 146.9 grams of water was mixed with 34.5 grams of NaOH, 189.1 grams of 29% cetyltrimethylammonium hydroxide and 110.7 grams of Ultrasil (92% $SiO_2$). After stirring overnight it was loaded into a 600 cc autoclave and reacted at 150° C. with 400 rpm stirring for 72 hours. The mixture had the following relative molar composition:

0.25 moles $Al_2O_3$
10 moles $Na_2O$
36 moles $SiO_2$
2.5 moles $(CTMA)_2O$
362.5 moles $H_2O$ Following filtration of the mixture, the solid product which precipitated from the filtrate was recovered by filtration, washed with water, then calcined at 550° C. for 10 hours in air.

The calcined product proved to have a surface area of 1193 m²/g and the following equilibrium adsorption capacities in grams/100 grams anhydrous sorbent:

| | |
|---|---|
| $H_2O$ | 10.2 |
| Cyclohexane | >50 |
| n-Hexane | 48.9 |
| Benzene | 68.1 |

Figure 9:
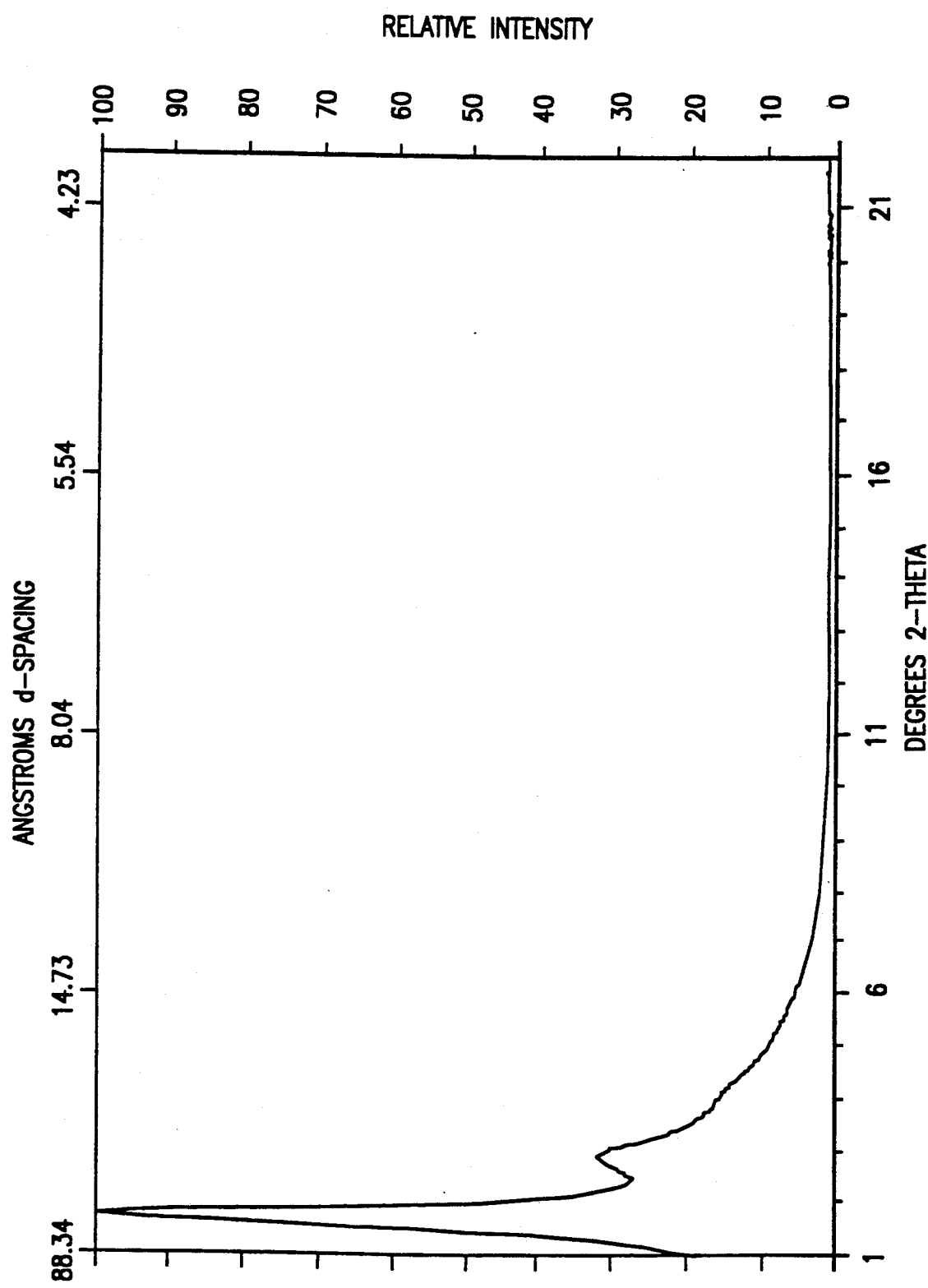

The X-ray diffraction pattern of the calcined product of this example is shown in FIG. 9. It may be characterized as including a very strong relative intensity line at 50.7±3.0 Angstroms d-spacing and a weak line at 30.7±1.0 Angstroms.

EXAMPLE 11

A solution of 4.9 grams of $NaAlO_2$ (43.5% $Al_2O_3$, 30% $Na_2O$) in 37.5 grams of water was mixed with 46.3 cc of 40% tetraethylammonium hydroxide solution and 96 grams of colloidal silica (40%, Ludox HS-40). The gel was stirred vigorously for 0.5 hour, mixed with an equal volume (150 ml) of 29% cetyltrimethylammonium hydroxide solution and reacted at 130° C. with 200 rpm stirring for 24 hours. The mixture had the following composition in terms of moles per mole $Al_2O_3$:

1.1 moles $Na_2O$
30.6 moles $SiO_2$
3.0 moles $(TEA)_2O$
3.25 moles $(CTMA)_2O$
609 moles $H_2O$ The resulting solid product was recovered by filtration, washed with water, then calcined at 540° C. for 16 hours.

The calcined product proved to have a surface area of 137 m²/g and the following equilibrium adsorption capacities in grams/100 grams anhydrous sorbent:

| | |
|---|---|
| $H_2O$ | 33.0 |
| Cyclohexane | >50 |
| n-Hexane | >50 |
| Benzene | 69.7 |

Figure 10:
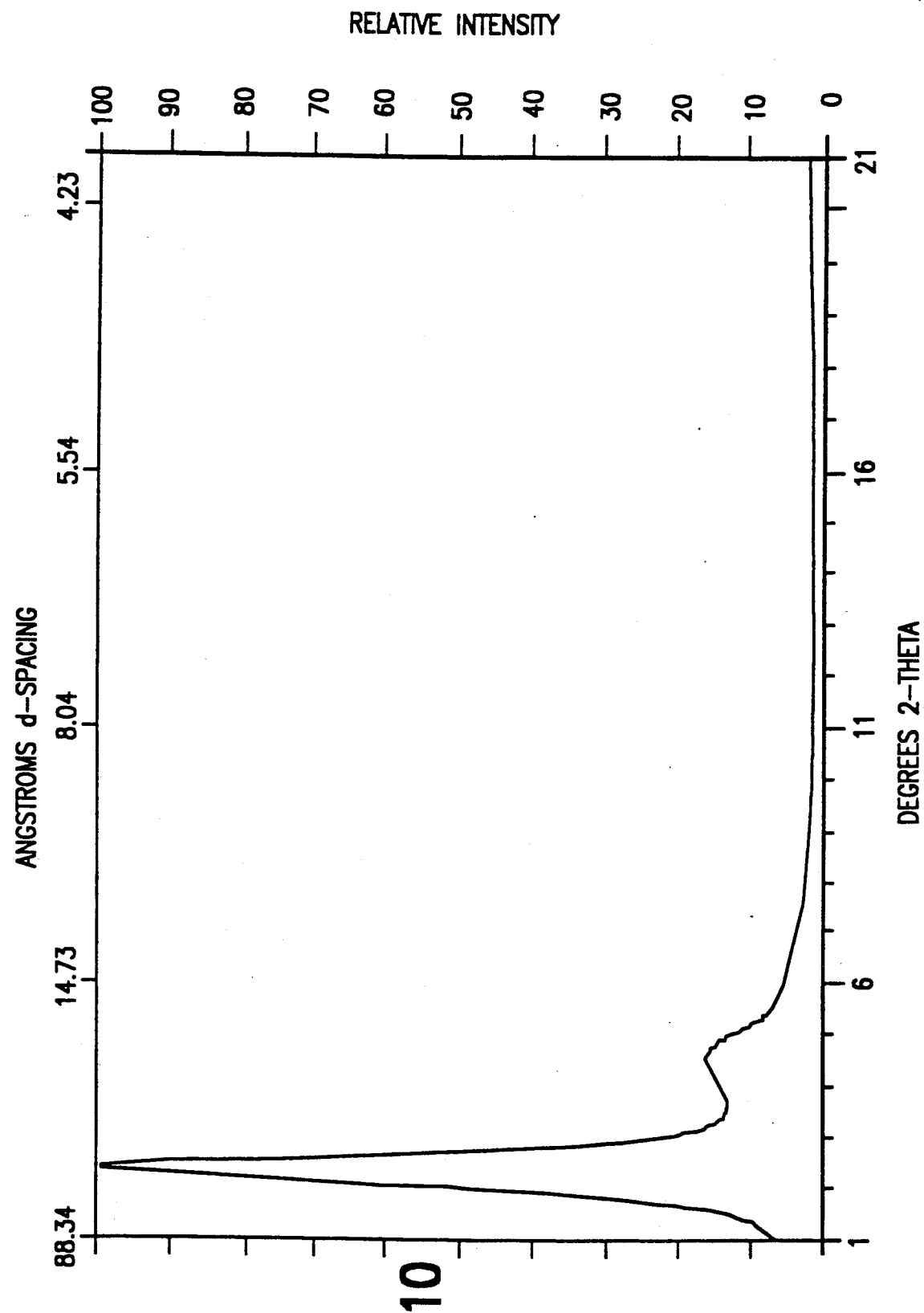

The X-ray diffraction pattern of the calcined product of this example is shown in FIG. 10. The product of this example may be characterized as including a very strong relative intensity line at 36.5±2.0 Angstroms d-spacing and a weak line at 19.8±0.5 Angstroms.

EXAMPLE 12

Figure 11:
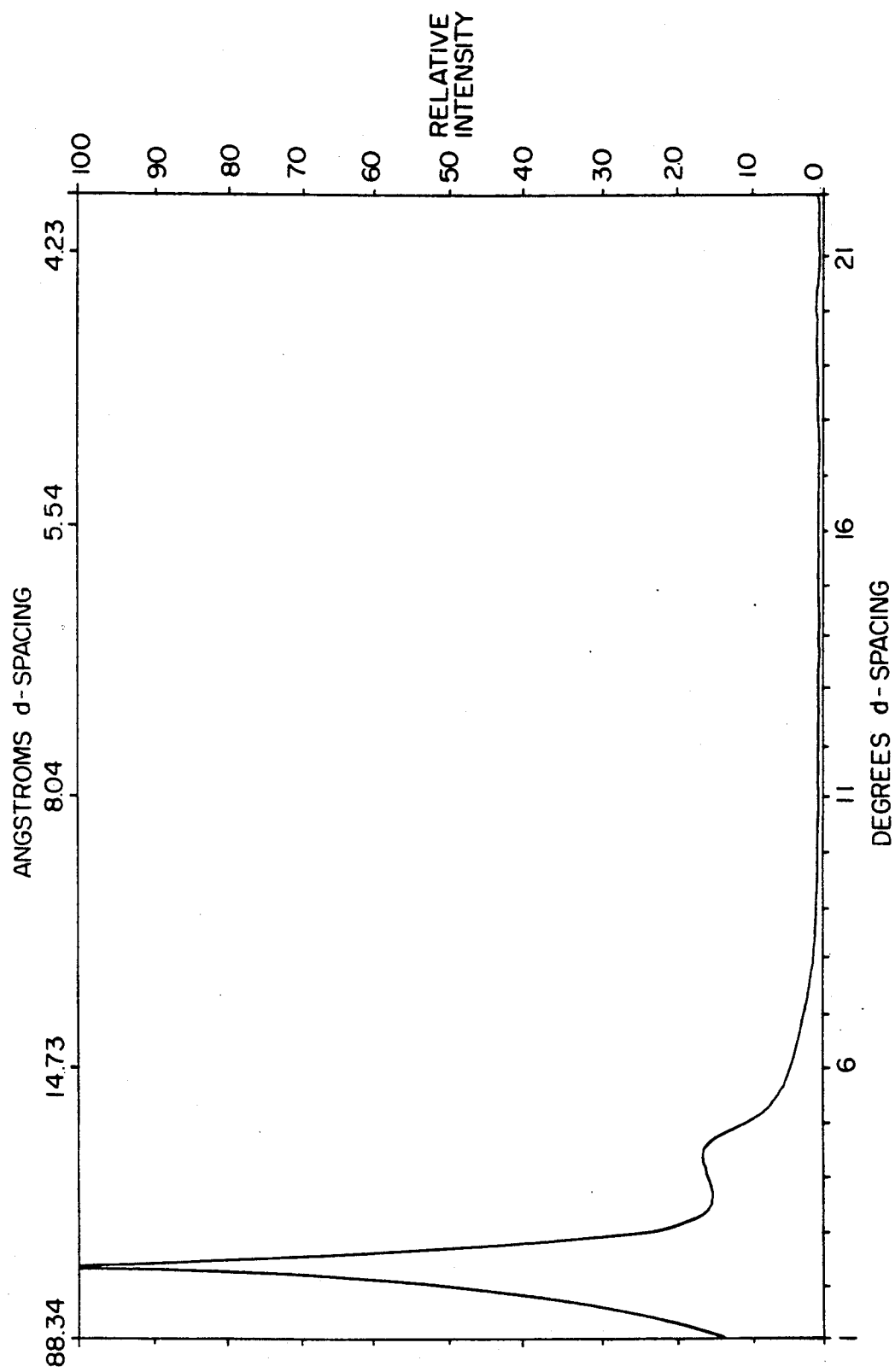

A separate product was prepared as in Example 11, except the reaction conditions included a temperature of 100° C. for hours. The calcined product was proven by analysis to be the ultra-large pore material of the present invention having the X-ray diffraction pattern of FIG. 11, and a benzene equilibrium adsorption capacity of 67.5 grams/100 grams anhydrous sorbent.

EXAMPLE 13

Two hundred grams of 29% cetyltrimethylammonium (CTMA) hydroxide was combined with 4.15 grams of sodium aluminate and gram of tetramethylammonium (TMA) silicate (10% silica) with stirring. Twenty-five grams of HiSil, a precipitated hydrated silica containing about 6 wt.% free water and about 4.5 wt.% bound water of hydration and having an ultimate particle size of about 0.02 micron, was added. The resulting mixture was placed in a static autoclave at 150° C. for 24 hours.

The mixture had a composition in terms of moles per mole $Al_2O_3$ 1.25 moles $Na_2O$
29.9 moles $SiO_2$
5.44 moles $(CTMA)_2O$
4.70 moles $(TMA)_2O$
705 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 932 $m^2/g$ and the following equilibrium adsorption capacities in grams/100 grams anhydrous sorbent:

| | |
|---|---|
| $H_2O$ | 39.3 |
| Cyclohexane | 46.6 |
| n-Hexane | 37.5 |
| Benzene | 50 |

The product of this example was then ammonium exchanged with 1N $NH_4NO_3$ solution, followed by calcination at 540° C. for hours in air.

EXAMPLE 14

Two hundred grams of 29% cetyltrimethylammonium (CTMA) hydroxide was combined with 4.15 grams of sodium aluminate and grams of tetramethylammonium (TMA) silicate (10% silica) with stirring. Twenty-five grams of HiSil, a precipitated hydrated silica containing about 6 wt.% free water and about 4.5 wt.% bound water of hydration and having an ultimate particle size of about 0.02 micron, was added. The resulting mixture was placed in a steam box at 100° C. for 48 hours. The mixture had a composition in terms of moles per mole $Al_2O_3$:

1.25 moles $Na_2O$
29.9 moles $SiO_2$
5.44 moles $(CTMA)_2O$
4.70 moles $(TMA)_2O$
705 moles $H_2O$ The resulting solid product was recovered by filtration and dried in air at ambient temperature. The product was then calcined at 540° C. for 1 hour in nitrogen, followed by 6 hours in air.

The calcined product proved to have the following equilibrium adsorption capacities in grams/100 grams anhydrous sorbent:

| | |
|---|---|
| $H_2O$ | 35.2 |
| Cyclohexane | >50 |
| n-Hexane | 40.8 |
| Benzene | 53.5 |

Figure 12:
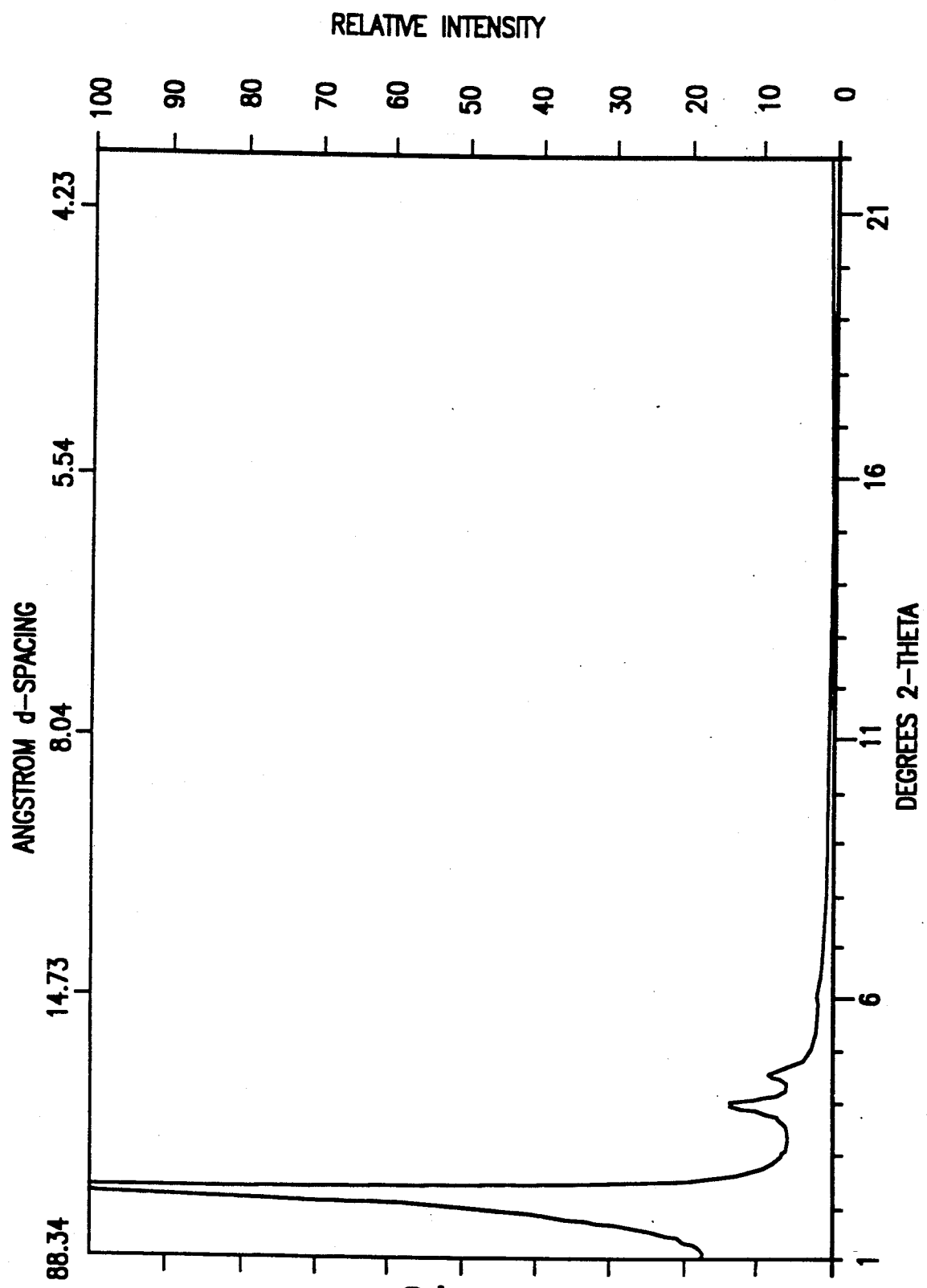

The X-ray diffraction pattern of the calcined product of this example is shown in FIG. 12. This product may be characterized as including a very strong relative intensity line at 39.1"2.0 Angstroms d-spacing and weak lines at 22.4±0.5 and 19.4±0.5 Angstroms.

The product of this example was then ammonium exchanged with 1N $NH_4NO_3$ solution, followed by calcination at 540° C. for 10 hours in air.

EXAMPLE 15

For comparison purposes, a commercially prepared ultra-stable zeolite Y was obtained. It had a benzene equilibrium adsorption capacity of 20.7 grams/100 grams anhydrous sorbent.

EXAMPLE 16

For catalytic evaluation of the present invention, catalytically active forms of the final products from Examples 13, 14 and 15 (USY) were evaluated for dealkylation of tri-tert-butylbenzene (TTBB) to di-tert-butylbenzene. The minimum diameter of TTBB, based on molecular models, is 10 Angstroms; thus, too large to enter the pore systems of large pore zeolites (e.g. faujasite such as zeolite Y with a pore diameter of 7-8 Angstroms). The present evaluation was conducted at a temperature of 225° C., weight hourly space velocity of 100 $hr^{-1}$, and atmospheric pressure. The feed was composed of 6.3/93.7 w/w TTBB/Toluene. Conversion was measured at 30 minutes on stream. The results were as follows:

| Catalyst | Conversion, wt. % |
|---|---|
| Example 13 | 96.7 |
| Example 14 | 92.8 |
| Example 15 | 12.0 |

EXAMPLE 17

In order to measure the catalytic cracking ability of catalyst for use in the present invention in relation to a known cracking catalyst, Alpha Values were determined for several example products. The Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec $^{-1}$). The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, vol. 61, p. 395. The results were:

| Product of Example | Alpha Value |
| --- | --- |
| 1 | 1 |
| 2 | 1 |
| 3 | 1 |
| 4 | 1 |
| 5 | 3 |
| 14 | 1 |

EXAMPLE 18

A quantity of catalyst material for use in the present process was prepared by charging the following components to an autoclave:

9965 g cetyltrimethylammonium (CTMA) hydroxide, prepared by contacting a 29 wt.% N,N,N-trimethyl-1-hexadecylammonium chloride solution with a hydroxide-for-halide exchange resin, 208 g sodium aluminate, 492 g tetramethylammonium silicate (10% aqueous solution), and 1245 g precipitated hydrated silica (HiSil).

The admixture was crystallized at 100° C. for 20 hours with stirring under autogeneous pressure. The resulting product was recovered by filtration and dried in air at ambient temperature. A sample of the product was calcined at 540° C. for 1 hour in nitrogen, followed by 6 hours in air.

The calcined product had a surface area of 1120 m$^2$/g and the following equilibrium absorption capacities in grams/100 grams:

| | |
| --- | --- |
| H$_2$O | 10.8 |
| Cyclohexane | >50 |
| n-Hexane | >50 |
| Benzene | 67 |

The X-ray diffraction pattern of the calcined product of this example included a very strong relative intensity line at 38.4±2.0 Angstroms d-spacing, and weak lines at 22.6±1.0, 20.0±1.0 and 15.2±1.0 Angstroms.

The crystalline product was exchanged with room temperature aqueous solutions of ammonium nitrate and subsequently dried overnight at 121° C. A portion of the resultant crystals was combined with alumina to form a mixture of 65 parts by weight crystal and 35 parts alumina. Water was added to this mixture to allow the resulting catalyst to be formed into extrudates. The catalyst was activated by calcination at 510° C. in 5v/v/min of nitrogen for 6 hours followed by the replacement of the nitrogen with 5v/v/min of air. The calcination was completed by raising the temperature to 538° C. and maintaining that temperature in 5v/v/min air for 18 hours. Nickel and tungsten were incorporated via incipient wetness coimpregnation using solutions of Ni(NO$_3$)$_2$·6H$_2$O and (NH$_4$)$_6$H$_2$W$_{12}$O$_{40}$·H$_2$O. After drying overnight at 121° C., the extrudate was calcined in 5v/v/min air at 538° C. for 3 hours. Physical and chemical properties of the final catalyst were determined to be:

| | |
| --- | --- |
| Nickel, wt. % | 3.7 |
| Tungsten, wt. % | 9.2 |
| Sodium, ppm | 200 |
| Surface Area, m$^2$/g | 530 |
| Pore Volume, cc/g | 0.780 |
| Particle Density, g/cc | 0.883 |
| Real Density, g/cc | 2.837 |

EXAMPLE 19

The catalyst of Example 18 was used as the hydrocracking catalyst in a cascade moderate-pressure system. The catalyst fill ratio was 4.08 g of commercially available hydrotreating catalyst to reduce nitrogen and sulfur content of the feedstock before contact with hydrocracking catalyst, and 6.40 g of Example 18 catalyst to give a HDT/HDC weight ratio of 0.64, with a total catalyst volume of 20.2 cc. The feed was a heavy vacuum gas oil from a Persian Gulf crude having the properties listed below, and the reaction conditions included 1200 psig hydrogen pressure, 4500 SCFB hydrogen circulation and 0.5 hr$^{-1}$ LHSV. Severity was varied by adjusting reactor temperature from 720°–770° F. The reactor severity is measured by 650° F.$^-$ boiling range conversion which is defined as:

$$650° \text{ F.}^- \text{ conversion} = \frac{650° \text{ F.}^- \text{ in Feed (wt \%)} - 650° \text{ F.}^- \text{ in Product (wt \%)}}{650° \text{ F.}^- \text{ in Feed (wt \%)}}$$

Properties of Persian Gulf VGO

| | |
| --- | --- |
| Hydrogen, wt. % | 12.6 |
| Nitrogen, ppm | 650 |
| Basic Nitrogen, ppm | 198 |
| Sulfur, wt. % | 2.3 |
| API Gravity | 22.6 |
| Pour Point, °F. | 90 |
| Composition, wt. % | |
| Paraffins | 27.7 |
| Mononaphthenes | 8.3 |
| Polynaphthenes | 14.6 |
| Aromatics | 49.4 |
| Simulated Dist., wt. % | |
| IBP | 531° F. |
| 5 | 687 |
| 10 | 715 |
| 20 | 745 |
| 30 | 770 |
| 40 | 793 |
| 50 | 816 |
| 60 | 841 |
| 70 | 866 |
| 80 | 897 |
| 90 | 942 |
| 95 | 970 |
| EP | 1071 |

The results of this experiment are presented below, showing that the catalyst for use herein produces kerosene (330°–440° F. fraction) and distillate (440°–650° F. fraction) products.

| | |
| --- | --- |
| Reactor Temp, °F. | 753 |
| Product Composition, wt. % | |
| C$_1$–C$_4$ | 4.0 |
| C$_5$–330° F. | 10.5 |
| 330–440 | 9.0 |
| 440–650 | 22.5 |
| 650–750 | 18 |
| 750$^-$ | 35 |
| H$_2$ Cons., SCFB | 850 |

EXAMPLE 20

Argon Physisorption

A 0.2 gram sample of the product of Example 4 was placed in a glass sample tube and attached to a physisorption apparatus as described in U.S. Pat. No. 4,762,010, which is incorporated herein by reference.

Figure 13:
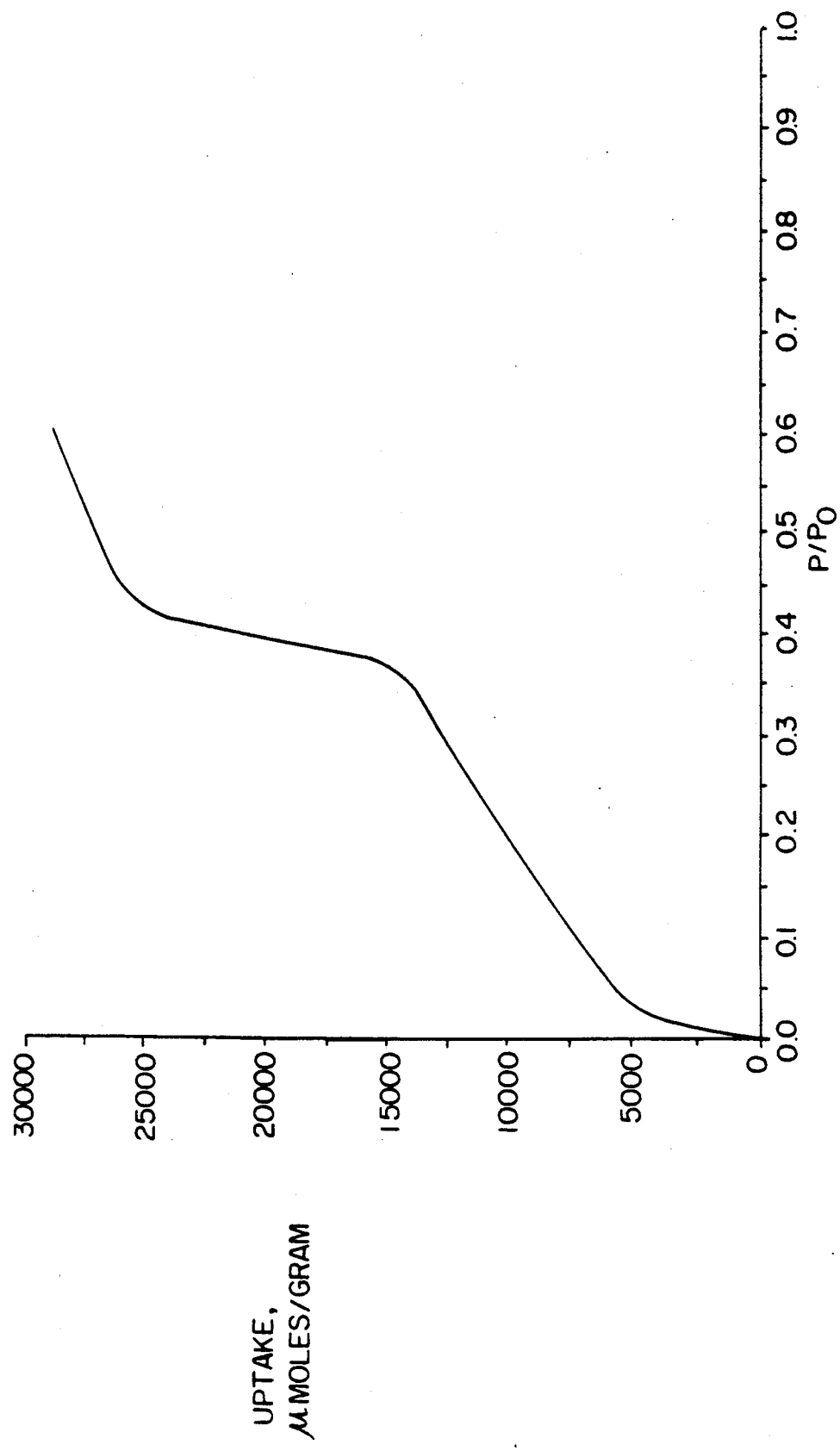
FIG. 13 is an isotherm plot of physisorption measurements from Example 17.

The sample was heated to 300° C. for 3 hours in vacuo to remove adsorbed water. Thereafter, the sample was cooled to 87° K. by immersion of the sample tube in liquid argon. Metered amounts of gaseous argon were then admitted to the sample in a stepwise manner as described in U.S. Pat. No. 4,762,010, column 20. From the amount of argon admitted to the sample and the amount of argon left in the gas space above the sample, the amount of argon adsorbed can be calculated. For this calculation, the ideal gas law and the calibrated sample volume were used. (See also S. J. Gregg et al., *Adsorption, Surface Area and Porosity*, 2nd ed., Academic Press, 1982.) A graph of the amount adsorbed versus the relative pressure above the sample, at equilibrium, constitutes the adsorption isotherm as shown in FIG. 13. It is common to use relative pressures which are obtained by forming the ratio of the equilibrium pressure and the vapor pressure $P_o$ of the adsorbate at the temperature where the isotherm is measured. Sufficiently small amounts of argon were admitted in each step to generate 168 data points in the relative pressure range from 0 to 0.6. At least about 100 points are required to define the isotherm with sufficient detail.

Figure 14:
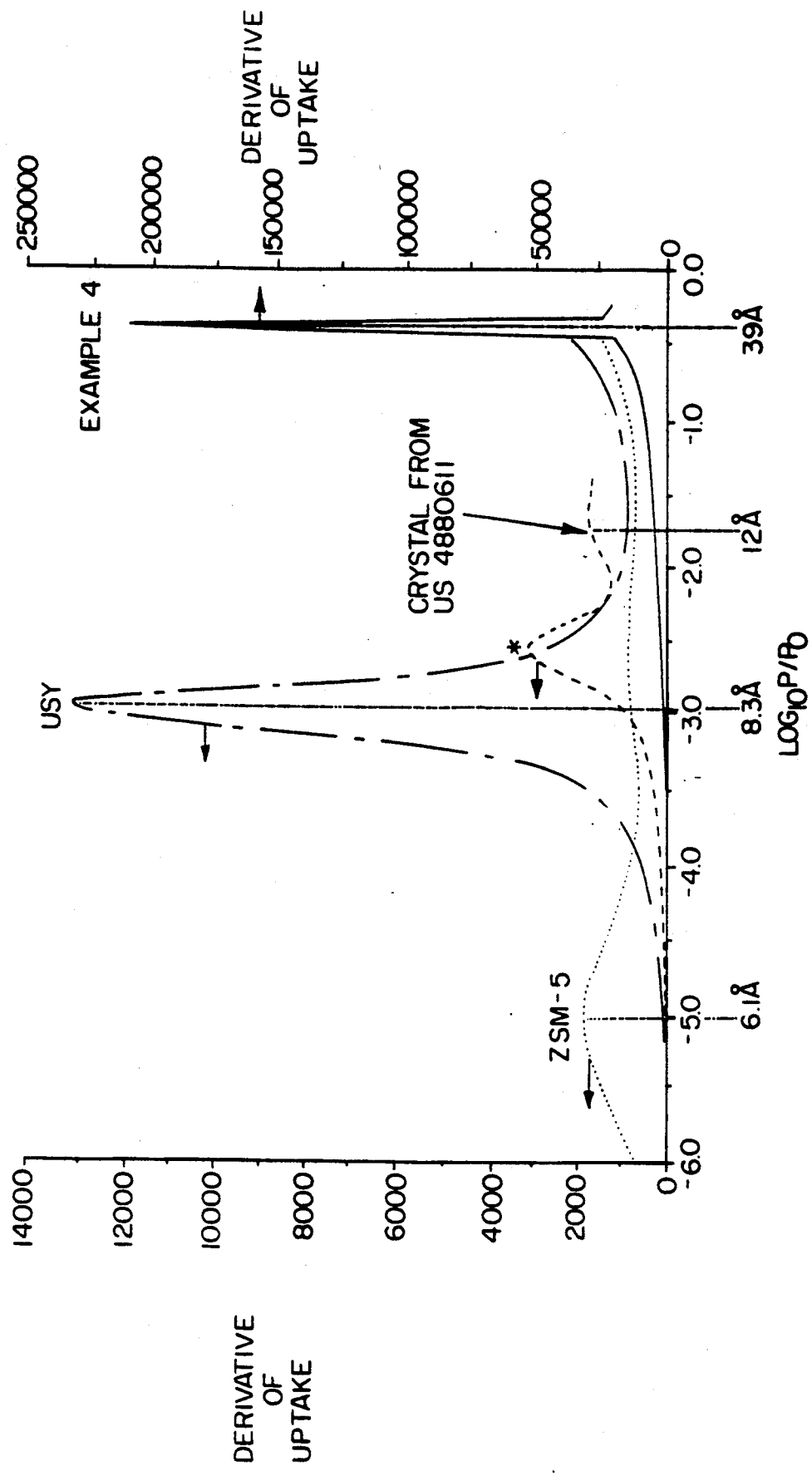
FIG. 14 is a plot of physisorption measurements from Example 17 showing pore sizes of various crystalline materials.

The step (inflection) in the isotherm, in this case at about $P/P_o=0.4$, indicates filling of a pore system. The size of the step indicates the amount adsorbed, whereas the position of the step in terms of $P/P_o$ reflects the size of the pores in which the adsorption takes place. Larger pores are filled at higher $P/P_o$. In order to better locate the position of the step in the isotherm, the derivative with respect to $\log(P/P_o)$ is formed. This is shown in FIG. 14. Also shown in FIG. 14 are data obtained in an identical fashion for a crystalline material from U.S. Pat. No. 4,880,611 and several other crystal materials. There is further provided a physical scale on the axis which converts the position of an adsorption peak in terms of $\log(P/P_o)$ to the physical pore diameter in Angstroms. This conversion was obtained by using the following formula:

$$\log(P/P_o) = \frac{K}{d - 0.38} \left( \frac{S^4}{3(L - D/2)^3} - \frac{S^{10}}{9(L - D/2)^9} - \frac{S^4}{3(D/2)^3} + \frac{S^{10}}{9(D/2)^9} \right)$$

wherein d=pore diameter in nanometers, K=32.17, S=0.2446, L=d+0.19, and D=0.57.

This formula is derived from the method of Horvath and Kawazoe ( G. Horvath et al., *J. Chem. Eng.* Japan 16 (6) 470(1983)). The constants required for the implementation of this formula were determined from a measured isotherm of AlPO-5 and its known pore size. This method is particularly useful for microporous materials.

As is indicated in FIG. 14, the pore size of the material of Example 4, is 39 Angstroms with the peak occurring at $\log(P/P_o)= -0.4$ or $P/P_o=0.4$, while the pore size of the material from U.S. Pat. No. 4,880,611 is 12 Angstroms or $P/P_o=0.02$. In the other materials, a peak is observed at $P/P_o=0.015$ which is denoted by an asterisk in FIG. 14. This peak reflects adsorption on the walls of the pores and is not otherwise indicative of the size of the pores of a given material. A value of $P/P_o$ of 0.03 corresponds to 13 Angstroms pore size.

When a similar measurement was performed on the material of Example 5, the peak was found to be at $P/P_o=0.0925$, corresponding to a pore size of 18 Angstroms by the equation.

What is claimed is:

1. A process for effecting catalytic conversion of an organic compound-containing feedstock to conversion product which comprises contacting said feedstock under catalytic conversion conditions with a catalyst comprising an active form of an inorganic, non-pillared crystalline phase exhibiting, after calcination, an X-ray diffraction pattern with at least one peak at a position greater than about 18 Angstrom Units d-spacing with a relative intensity of 100, and a benzene adsorption capacity of greater than about 15 grams benzene per 100 grams crystal at 50 torr and 25° C.

2. The process of claim 1 wherein said crystalline phase has a composition expressed as follows:

$$M_{n/q}(W_a X_b Y_c Z_d O_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and $(a+b+c+d)=1$.

3. The process of claim 2 wherein the sum $(a+b+c)$ is greater than d, and h=2.

4. The process of claim 2 wherein W comprises a divalent first row transition metal selected from the group consisting of metal or magnesium; X comprises an element selected from the group consisting of aluminum, boron, gallium or iron; Y comprises an element selected from the group consisting of silicon or germanium; and Z comprises phosphorus.

5. The process of claim 3 wherein W comprises a divalent first row transition metal selected from the group consisting of metal or magnesium; X comprises an element selected from the group consisting of aluminum, boron, gallium or iron; Y comprises an element selected from the group consisting of silicon or germanium; and Z comprises phosphorus.

6. The process of claim 2 wherein a and d are 0 and h=2.

7. The process of claim 6 wherein X comprises an element selected from the group consisting of aluminum, boron, gallium or iron and Y comprises an element selected from the group consisting of silicon or germanium.

8. The process of claim 1 wherein said catalyst comprises ions selected from the group consisting of hydrogen and hydrogen precursors, rare earth metals, and metals of Groups IA, IIA, VIIA, VIIIA, IB, IIB, IIIB, IVB and VIIB of the Periodic Table of the Elements.

9. The process of claim 8 wherein said ions comprise hydrogen or a hydrogen precursor.

10. The process of claim 8 wherein said ions comprise metals.

11. The process of claim 1 wherein said catalyst comprises a matrix selected from the group consisting of alumina, silica, silica-alumina, titania, zirconia, clay and combination thereof.

12. The process of claim 1 wherein said organic compound is selected from the group consisting of alcohol, compound containing a carbonyl group, ether and mixture thereof, said conversion product comprises hydrocarbon compounds, and said conversion conditions include a temperature of from about 275° C. to about 600° C., a pressure of from about 0.5 atmosphere to about 50 atmospheres and a liquid hourly space velocity of from about $0.5 \text{ hr}^{-1}$ to about $100 \text{ hr}^{-1}$.

13. The process of claim 1 wherein said feedstock comprises hydrocarbon compounds and said conversion product comprises hydrocarbon compounds of lower molecular weight than feedstock hydrocarbon compounds.

14. The process of claim 13 wherein said conversion conditions include a temperature of from about 200° C. to about 800° C., a pressure of from about atmospheric to about 100 psig and a contact time of from about 0.1 second to about 60 minutes.

15. The process of claim 13 wherein said conversion conditions include a temperature of from about 150° C. to about 550° C., a pressure of from about 100 psig to about 3000 psig. a
weight hourly space velocity of from about $0.1 \text{ hr}^{-1}$ to about $100 \text{ hr}^{-1}$ and a hydrogen/hydrocarbon molar ratio of from about 0.1 to about 100.

16. A process of effecting catalytic conversion of an organic compound-containing feedstock to conversion product which comprises contacting said feedstock under catalytic conversion conditions with a catalyst comprising an active form of an inorganic, non-pillared crystalline phase exhibiting an X-ray diffraction pattern following calcination with at least two peaks at positions greater than about 10 Angstrom Units d-spacing, at least one of which is at a position greater than about 18 Angstrom Units d-spacing, and no peaks at positions less than about 10 Angstrom Units d-spacing with relative intensity greater than about 20% of the strongest peak.

17. The process of claim 12 wherein said crystalline phase has a composition expressed as follows:

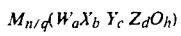

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and (a+b+c+d)=1.

18. The process of claim 17 wherein the sum (a+b+c) is greater than d, and h=2.

19. The process of claim 17 wherein W comprises a divalent first row transition metal selected from the group consisting of metal or magnesium; X comprises an element selected from the group consisting of aluminum, boron, gallium or iron; Y comprises an element selected from the group consisting of silicon or germanium; and Z comprises phosphorus.

20. The process of claim 18 wherein W comprises a divalent first row transition metal selected from the group consisting of metal or magnesium; X comprises an element selected from the group consisting of aluminum, boron, gallium or iron; Y comprises an element selected from the group consisting of silicon or germanium; and Z comprises phosphorus.

21. The process of claim 17 wherein a and d are 0 and h=2.

22. The process of claim 13 wherein X comprises an element selected from the group consisting of aluminum, boron, gallium or iron and Y comprises an element selected from the group consisting of silicon or germanium.

23. The process of claim 16 wherein said catalyst comprises ions selected from the group consisting of hydrogen and hydrogen precursors, rare earth metals, and metals of Groups IA, IIA, VIIA, VIIIA, IB, IIB, IIIB, IVB and VIIB of the Periodic Table of the Elements.

24. The process of claim 23 wherein said ions comprise hydrogen or a hydrogen precursor.

25. The process of claim 23 wherein said ions comprise metals.

26. The process of claim 16 wherein said catalyst comprises a matrix selected from the group consisting of alumina, silica, silica-alumina, titania, zirconia, clay and combination thereof.

27. A process for effecting catalytic conversion of an organic compound-containing feedstock to conversion product which comprises contacting said feedstock under catalytic conversion conditions with a catalyst comprising an active form of an inorganic, non-pillared crystalline phase having a pore size of about 13 Angstroms or greater and exhibiting, after calcination, an X-ray diffraction pattern with at least one peak at a position greater than about 18 Angstrom Units d-spacing with a relative intensity of 100.

28. The process of claim 27 wherein said crystalline phase has a composition expressed as follows:

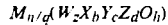

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and (a+b+c+d)=1.

29. The process of claim 28 wherein the sum (a+b+c) is greater than d, and h=2.

30. The process of claim 28 wherein W comprises a divalent first row transition metal selected from the group consisting of metal or magnesium; X comprises an element selected from the group consisting of aluminum, boron, gallium or iron; Y comprises an element selected from the group consisting of silicon or germanium; and Z comprises phosphorus.

31. The process of claim 29 wherein W comprises a divalent first row transition metal selected from the group consisting of metal or magnesium; X comprises an element selected from the group consisting of aluminum, boron, gallium or iron; Y comprises an element selected from the group consisting of silicon or germanium; and Z comprises phosphorus.

32. The process of claim 28 wherein a and d are 0 and h=2.

33. The process of claim 32 wherein X comprises an element selected from the group consisting of aluminum, boron, gallium or iron and Y comprises an element selected from the group consisting of silicon or germanium.

34. The process of claim 27 wherein said catalyst comprises ions selected from the group consisting of hydrogen and hydrogen precursors, rare earth metals, and metals of Groups IA, IIA, VIIA, VIIIA, IB, IIB, IIIB, IVB and VIIB of the Periodic Table of the Elements.

35. The process of claim 34 wherein said ions comprise hydrogen or a hydrogen precursor.

36. The process of claim 34 wherein said ions comprise metals.

37. The process of claim 27 wherein said catalyst comprises a matrix selected from the group consisting of alumina, silica, silica-alumina, titania, zirconia, clay and combination thereof.

* * * * *

UNITED STATES PATENT AND TRADEMARK OFFICE
CERTIFICATE OF CORRECTION

PATENT NO. : 5,174,888

DATED : December 29, 1992

INVENTOR(S) : C.T. Kresge et al.

It is certified that error appears in the above-identified patent and that said Letters Patent is hereby corrected as shown below:

| | |
|---|---|
| Col. 14, line 5 | begin new paragraph at --The-- |
| Col. 14, line 25 | begin new paragraph at --Another-- |
| Col. 17, line 53 | "rams" should be --grams-- |
| Col. 18, line 54 | "137 $m^2$/g" should be --1347 $m^2$/g-- |
| Col. 19, line 5 | insert --168-- before "hours" |
| Col. 19, line 14 | insert --100-- before "grams" |
| Col. 19, line 45 | insert --10-- before "hours" |
| Col. 19, line 51 | insert --100-- before "grams" (second occurrence) |
| Col. 20, line 14 | "39.1"2.0" should be --39.1 $\pm$ 2.0-- |

Signed and Sealed this

Fourteenth Day of December, 1993

Attest:

*Attesting Officer*

BRUCE LEHMAN

*Commissioner of Patents and Trademarks*